United States Patent [19]

Tsutsumi

[11] Patent Number: 5,246,660
[45] Date of Patent: Sep. 21, 1993

[54] PROCESS AND APPARATUS FOR INJECTION MOLDING WITH MELT FILTRATION AND MIXING

[75] Inventor: Shigeru Tsutsumi, Yonezawa, Japan
[73] Assignee: Seiki Corporation, Tokyo, Japan
[21] Appl. No.: 859,721
[22] PCT Filed: Jan. 28, 1991
[86] PCT No.: PCT/JP91/00089
 § 371 Date: Aug. 6, 1992
 § 102(e) Date: Aug. 6, 1992
[87] PCT Pub. No.: WO92/05940
 PCT Pub. Date: Apr. 16, 1992

[30] Foreign Application Priority Data

Oct. 6, 1990 [WO] PCT Int'l Appl. ... PCT/JP90/01301
 Nov. 16, 1990 [WO] PCT Int'l Appl. ... PCT/JP90/01503

[51] Int. Cl.⁵ .................. B29C 45/24; B29C 45/52
[52] U.S. Cl. .................. 264/328.17; 425/197; 425/207; 425/224; 425/562; 366/81; 366/82
[58] Field of Search .................. 264/328.1, 328.16, 37, 264/328.17; 425/197, 204, 207, 582, 583, 587, 562, 563, 224; 366/81, 82

[56] References Cited

U.S. PATENT DOCUMENTS

| | | |
|---|---|---|
| 3,335,461 | 8/1967 | Schwartz ........................ 425/587 |
| 3,710,988 | 1/1973 | Moslo . |
| 4,112,516 | 9/1978 | Hotz . |
| 4,512,733 | 4/1985 | Eichlseder et al. ........... 425/562 |
| 4,627,916 | 12/1986 | Dörsam . |
| 4,966,539 | 10/1990 | Pena ................................ 425/563 |

FOREIGN PATENT DOCUMENTS

| | | |
|---|---|---|
| 0172925 | 3/1986 | European Pat. Off. . |
| 2524746 | 12/1976 | Fed. Rep. of Germany . |
| 2541738 | 3/1977 | Fed. Rep. of Germany . |
| 1242329 | 8/1960 | France . |
| 1553319 | 1/1969 | France . |
| 2324443 | 4/1977 | France . |
| 9003879 | 4/1990 | World Int. Prop. O. . |

*Primary Examiner*—Jill L. Heitbrink
*Attorney, Agent, or Firm*—Kenyon & Kenyon

[57] ABSTRACT

A process and apparatus for injection molding of plastic material incorporate a perforated member for melt filtering and/or melt mixing during metering of plasticized material. The perforated member may be of a disk form mounted to a screw plunger provided within a machine body with the perforations arranged around the screw plunger. Impurities accumulated at the perforated member may be purged by rotating the screw plunger from a nozzle connected to the machine body via an annular recess formed at an inner surface of the machine body or directly from the machine body per se via a radial hole formed therein, when the screw plunger is in a predetermined position preferably in the most forward position, where the recess or the hole is located in the vicinity of the perforated member.

26 Claims, 12 Drawing Sheets

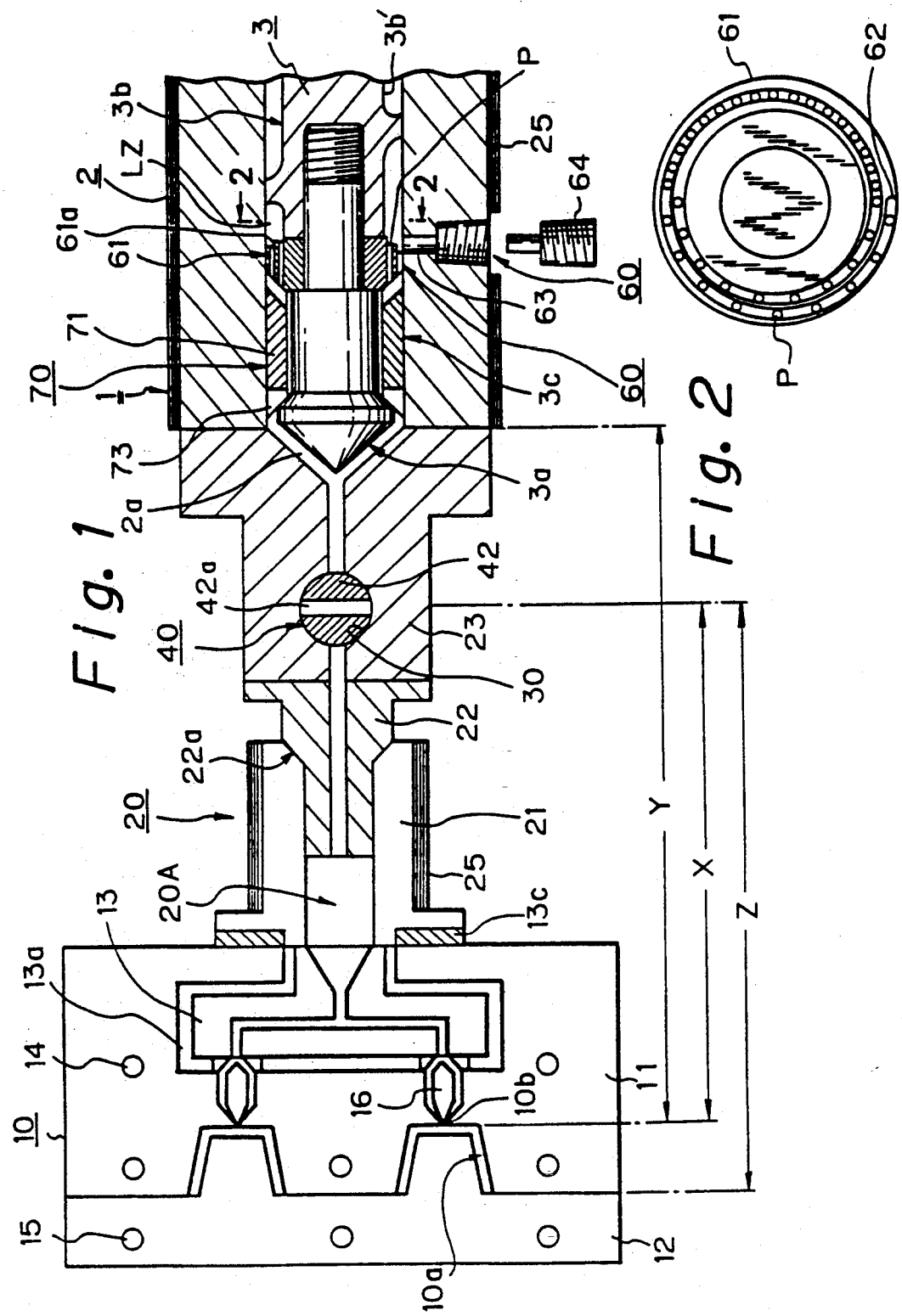

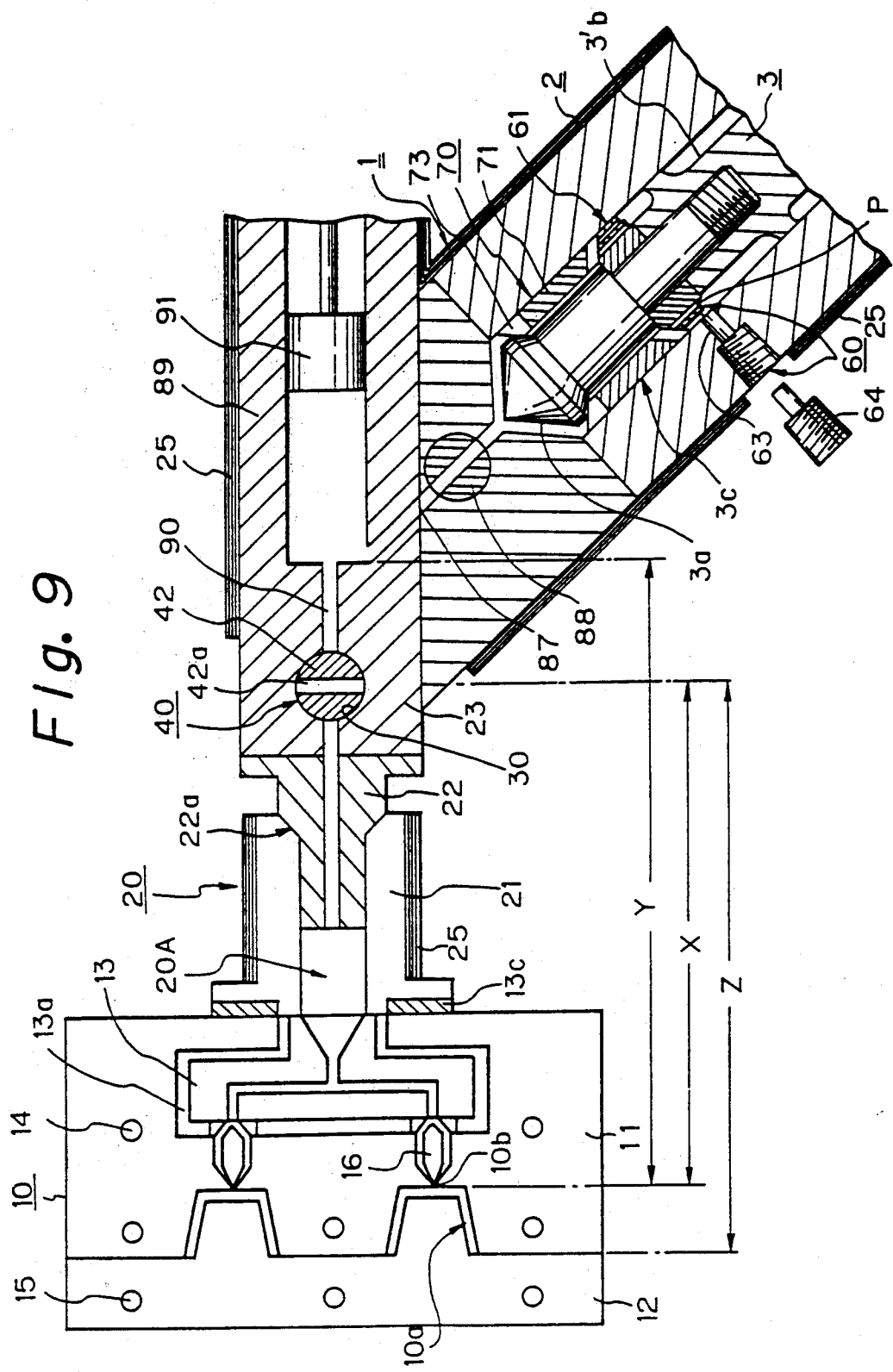

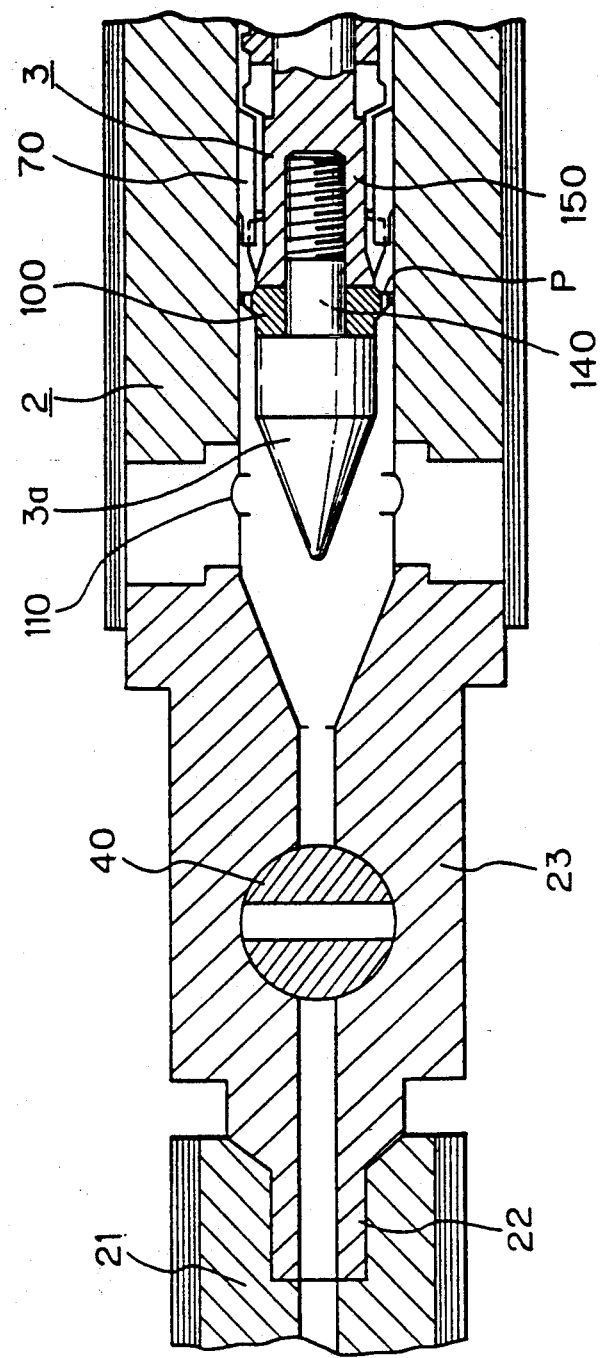

PROCESS AND APPARATUS FOR INJECTION MOLDING WITH MELT FILTRATION AND MIXING

TECHNICAL FIELD

The present invention relates to a process and apparatus for materials improved to provide effective melt filtration and mixing.

BACKGROUND ART

As described in, for example, U.S. Pat. No. 3,767,056, with an injection molding of plastic material in an injection molding apparatus, it is desired to filter hot running plastic to remove impurities or foreign materials, bits of unmelted plastic and the like during an injection step where the hot plastic material is forced to run toward a mold cavity. Otherwise, clogging of a melt passage leading to a mold cavity with such impurities is likely to occur with the result that a long run operation of injection molding is interrupted. This interruption may require replacement of a hot or cold runner mold and/or a manifold forming a section of the melt passage, and such replacement leads to an increased equipment or machine cost, and also leads to a reduction in molding productivity since the continuously repeated injection molding operation is interrupted.

In this regard, prior arts including the above U.S. patent incorporate melt filtering devices provided in a nozzle detachably connected to a barrel forming a body of the injection machine. The filtering device comprises a tubular member having a plurality of round or elongated perforations formed therethrough in a parallel and spaced relation The perforated tubular member is disposed in or connected to the nozzle so that the perforations communicate with the nozzle.

According to some of the prior arts, such a melt filtering device or means is provided with a means for purging the impurities accumulated upstream of, but in the vicinity of, the perforations, as needed. Such a purging operation, for example, is performed with the melt including the accumulated impurities discharged out of an outlet of the nozzle without passing through the perforations. This requires detachment of the nozzle with the barrel from a mold arrangement defining the mold cavity, and thus requires a relatively long period of time to reset up the injection molding machine for a normal injection molding operation.

In the meantime, it is noted that the conventional melt filtering device has an inherent problem in that it is subjected to a high pressure loss or exhibits a high pressure resistance against a hot plasticized material, the so called "melt", in the process of injection. Such a high pressure loss due to the filtration is increased as filtration performance is increased and also as an injection rate or speed is increased. The filtration performance relies on a size of the perforations.

With a nozzle provided with no such melt filtering device, an injection molding apparatus comprising a mold arrangement, including a cavity mold and a hot runner mold and/or a manifold, and an injection machine having the nozzle, is required to be subjected to a high fluid pressure loss or exert an injection pressure, for example, of 100 kg/cm² to attain a desired injection rate. In this connection, the same injection molding apparatus but with a melt filtering device provided in the nozzle is required to exert a higher injection pressure of 115 or more kg/cm² to attain the same injection rate. The increase in the injection pressure is due to the flow resistance of the melt filtering device, and with a higher injection rate an increased injection power is required accordingly. The higher injection power, naturally, requires an increased driving power to be exerted by the injection machine. This results in that some cases require a more powerful hydraulic driving apparatus to be incorporated in the injection machine for driving a screw plunger disposed in the barrel for rotation and axial reciprocation, resulting in increased machine cost.

Otherwise, or in a less powerful machine case, an apparatus with melt filtering means is likely to operate with an injection rate lower (for example, 60 to 65 g/sec) than that (for example, 70 g/sec) of the same apparatus but with melt filtering nozzle means provided. Such a decreased injection rate in the non-filtering apparatus affects production of a high quality molded article, particularly a thin product having a complicated contour.

Apart from the above, there is a problem in that it is not easy to provide a molded product, which is of a high quality due to a uniform distribution of different plastic materials and/or coloring pigments or the like therein. To solve the problem, there have been various efforts made in designing a screw plunger and providing starting materials which consist of a plurality of materials well mixed with each other in advance for enhancing the distribution degree of the materials in a molded product.

DISCLOSURE OF THE INVENTION

A first object of the present invention is to provide a process and apparatus for injection molding of plastic material with improved melt filtration for removing possible impurities contained in a plasticized material, which melt filtration is effected with no substantial increase in driving power for injection relative to a case where no melt filtration is effected.

A second object of the present invention is to provide a process and apparatus for injection molding of plastic material with improved melt filtering means which facilitates purging of accumulated impurities out of the machine system, and also removing impurities clogging the filtering means therefrom, resulting in increased long run productivity due to a decreased period of time during which temporary stopping of the operational run is effected for the purging and/or the removing and then for resetting the apparatus for normal injection molding operation. Both the purging and removing processes can be performed without substantially disassembling any part of the apparatus.

A third object of the present invention is to provide a means for admixing a variety of materials incorporated in an injection machine with a screw plunger before injection of the materials toward a mold cavity to thereby provide a molded product with a distribution of the materials therein mixed well with each other.

According to the present invention, there is provided a process of injection molding with melt filtration, using an injection machine having a body provided there with means for plasticizing, metering and injecting plastic material and a hollow extension, comprising a nozzle, therefrom forming a nozzle passage, and a mold arrangement defining a cavity, the mold arrangement incorporated with the machine to communicate between the interior of the machine body and the mold cavity via the nozzle passage. The process comprises the steps of:

having a plastic material, in every shot cycle, plasticized and metered while being heated within the machine body;

having the hot plasticized material injected under pressure for the mold cavity through the nozzle passage; and having the hot injected material held at least partially within the entire mold cavity under pressure while the mold arrangement is being cooled to thereby provide and freeze a molded article therein.

The process is characterized in that the plasticizing and metering step is carried out such that the plasticized material is subjected to the melt filtration during the metering, and the injecting step is carried out with the filtered and metered material.

In this process the melt is subjected to the filtration not by passing the melt through a filter disposed in or connected to the nozzle but by passing a filter connected to the metering means through the melt as the metering means is withdrawn in the metering stage.

The process may be carried out in an injection machine in which the means for plasticizing, metering and injecting plastic material is a single screw plunger which may be rotated and reciprocated axially in a barred formed in the machine body to plasticize, meter and inject the plastic material. Using such a machine, a process having the above characterizing feature may be applied in a universality used non-pressure-holding chamber system where the nozzle passage is kept open to the barrel after the injecting step, and the pressure-holding is effected by a screw injection plunger of the injection machine per se.

However, it is more preferable to apply the above feature using such a single barrel machine provided with a pressure-holding chamber system which effects an increased productivity due to a considerably shortened shot cycle period relative to the above universally used system. According to the pressure-holding chamber system, the nozzle passage is interrupted midway therealong from communication between the interior of the machine body and the mold cavity, after the injection step but while the material pressure-holding step is being carried out; and upon or after the nozzle passage interruption, the plasticizing and metering step is carried out by the injection machine for a next shot or injection, the plasticized material being subjected to the melt filtration during the pressure-holding step.

With respect to such a pressure-holding system, there are three kinds of systems. One kind of system is disclosed in EP 0204133A1, GB patent No. 888,448 and the like, wherein: a piston-cylinder is used in association with the nozzle passage so that a closed space variable in volume according to a piston stroke is defined by a combination of the mold cavity and the nozzle passage, or the combination with the piston-cylinder, with the nozzle passage interruption; and in the pressure-holding step the injected material compacted in the closed variable space is subjected to an external holding pressure by the piston-cylinder upon the nozzle passage interruption.

Another kind of system is disclosed in an International Application (in English) No. PCT/JP89/01052 filed by the present applicant, wherein in the pressure-holding step a closed space consisting of the cavity and a forward portion of the nozzle passage leading thereto is fixed in volume with said nozzle passage interruption to thereby have the injected material compacted therein exert an internal holding pressure.

The third kind of system is an improvement on the above second kind of system, and is disclosed in an International Application (in English) No. PCT/JP90/00300 also filed by the present applicant, wherein with the above internal pressure-holding chamber system, the material compacted in the fixed closed space in each shot is remetered or adjusted to a predetermined value in amount upon or after the nozzle passage interruption by discharging a possible excess part of the compacted material out of the machine system.

The same principle of melt filtering can be applied in an injection molding process using a machine in which there are two inclined barrel, one containing a screw plunger for plasticizing and metering the hot plastic material and the other containing means such as a piston or screw for injection into the mold cavity hot plastic material delivered into the other barrel by the metering screw plunger. In this case the process of filtering the plastic material is analogous to that described above, namely it involves passing a filter connected to the metering screw through the melt as the metering screw plunger is withdrawn in the barrel in the metering stage.

According to the present invention there is also provided an injection machine for molding with melt filtration having a body provided with means for plasticizing, metering and injecting plastic material comprising a screw rotatable in a cylindrical barrel for plasticizing the material, the screw being provided at its forward end with a filter for fitering impurities from the plasticized material as it is metered, and the barrel being provided with a purging hole in a position which in a purging operation for removal of the filtered impurities from the filter, is adjacent the upstream side of the filter.

Further, according to the present invention, there is provided an injection machine for carrying out plasticizing, metering and injecting steps of injection molding with a plastic material supplied therein, comprising a machine body forming a cylindrical barrel provided with a heating means, an exit passage and a screw plunger therein of a rod form with a helical screw thereabout for rotation and axially reciprocating movements. The screw plunger has a tip head portion and a main screw portion with a check valve therebetween. The check valve may comprise an annular valve body member slidable along the screw plunger and a circumferential valve seat member fixed on the screw plunger, and is provided to be opened for allowing a plasticized material to flow forwardly therethrough during the plasticizing and metering step where the screw plunger is allowed to move rearwardly against a back pressure with a metered material being accumulated in an axially variable space downstream of the tip head portion; and to be closed for allowing the screw plunger to push the entire amount of the accumulated material forwardly through the exit passage for injection. The tip head portion of the screw plunger may form a front valve abutment against which the valve body member abuts in an opened position of the check valve, whereas the first mentioned valve seat member which may be called "a rear valve seat member" abuts against the valve body member in a closed position of the check valve. Alternatively, such a front valve abutment may be provided as a member separate from the tip head portion, which is located adjacent to and upstream of the tip head portion.

Alternatively the check valve may be of a back-flow ring type with the valve body member forming an annular ring or of a ball check type with the valve body member being in the form of a ball.

The machine is characterized in that means for effecting a melt filtration while the plasticized material is subjected to the metering is provided in the machine body or the barrel, and is carried through the melt during metering.

The melt filtering means may comprise a perforated member mounted to the screw plunger, and preferably fitted slidably to an inner surface of the barrel, so that on rearward movement of the screw plunger the filter is carried through the melt thereby to filter it. The perforated member may be incorporated with the check valve such that it provides the above mentioned rear valve seat member, the above mentioned valve body member, or the above mentioned front valve abutment member in the following manner.

That is, the melt filtering means may comprise the rear valve seat member having circumferentially arranged perforations for the filtering and being mounted to the screw plunger between the valve body member and the main screw portion. The perforations are positioned to communicate with both an annular valve passage of the check valve between a rod section of the screw plunger and the annular valve body member of a non-perforated solid form and a plasticizing space defined between the main screw plunger portion and the barrel therein in which space the plastic material is plasticized.

Alternatively, the melt filtering means may comprise: the annular valve body member having circumferentially arranged perforations for the filtration and being axially slidably mounted to the screw plunger; and the circumferential rear valve seat member of a solid form being fixed to the screw plunger and slidably fitted to an internal surface of the barrel. The perforated valve body member is slidably fitted to both the internal barrel surface and an peripheral rod surface of the screw plunger with the perforations allowing the plasticized material to pass therethrough to thereby have the material pass through the check valve at an opened position thereof.

As a further alternative, the melt filtering means may comprise the front valve abutment member separate from the tip head portion, having circumferentially arranged perforations for the filtering and being mounted to the screw plunger between the tip head portion and the valve body member and slidably fitted to the inner surface of the barrel. The perforations form the only outlet(s) of the check valve so that the plasticized material is allowed to flow out of the check valve only through the perforations for the metering. In the alternative case where the tip head portion forms the front valve abutment, the tip head portion is designed so as to be slidably fitted to the inner surface of the barrel and have circumferentially arranged perforations for the filtering as well as the metering.

Alternatively, the melt filtering means may comprise a perforated member slidably fitted to the inner surface of the barrel, but being a member separate from the check valve and located upstream thereof, preferably adjacent thereto at a forward end of the main screw portion of the plunger with perforations circumferentially arranged for the filtration so that the filtered material is allowed to flow toward an inlet(s) of the check valve.

For each of the above mentioned filtering means, there is provided a radially extending through-hole or purging hole formed in a cylindrical wall of said barrel and means for closing and opening the purging hole. The closing and opening means may be a plug to be detachably connected to the purging hole, or a conventional shut-off valve. The purging hole is located in a axial position so that it opens to a local zone of the interior of the barrel in the vicinity of a rear face of the perforated member, when the screw plunger is in the most forward position, in order to have a portion of the plasticized material, with non-filtered impurities or residual foreign materials accumulated on the perforated rear face, in the local zone, discharged therefrom intermittently during a long run operation, through the purging hole by rotating the screw plunger in the most forward position.

The perforations may be either of a round shape cross section or an elongated shape cross section.

The screw plunger for plasticizing and metering the plastic material may also serve to inject the plastic material into the mold. Alternatively it may serve to feed the material and fitered charge of plastic material into a second barrel inclined to the barrel of the plasticizing and metering screw plunger from which second barrel it is injected by a piston or screw plunger into a mold. Such a system may or may not be a pressure holding system.

With the above-mentioned kinds of pressure-holding systems, the melt filtering means of the present invention incorporated therein is more meritorious than when incorporated in the universal non-pressure-holding system in that as described in detail later, the former case enables the valve means for interrupting the nozzle passage to be utilized so that the filtering means being clogged with impurities is released from the clogging, that is the impurities are back-flushed or removed from the filtering means by effecting a quasi-injection operation while the nozzle passage interruption is effected intentionally, whereas in the latter case such a releasing process as above cannot be performed since no corresponding nozzle passage interruption is ever effected.

Preferably, such a quasi-injection operation may be instantaneous and can also be repeated.

According to the present invention, such a filtering means as above may, of course, be mounted to the screw plunger at a position upstream or downstream of the check valves, that is, it may be incorporated with the screw plunger but not incorporated in the check valve. In a preferable case where the filter is provided at the plunger head downstream of the check valve, it may be preferable to have accumulated impurities behind the filter discharged through the nozzle, when the nozzle is separated with the machine body from the mold arrangement. In this case, in place of the above mentioned discharging hole provided in the barrel, an annular recess is formed at the forward portion of the barrel, which allows the melt with the accumulated impurities to pass over the filter through an annular gap between the filter and an annular bottom face of the recess and then to be discharged from the nozzle extended from the barrel. The removal of the impurities is effected by rotating the screw plunger, when the nozzle is intentionally separated from the mold arrangement and also the filter is positioned at the recess. Preferably the recess and the filter are in the same axial position when the screw plunger is in the most forward position.

In connection with the above, it has been found that the melt filtering means of the present invention also works as a means for effectively admixing a variety of materials supplied in the machine body through a hopper before injection of the materials.

A metering chamber variable in volume defined by the barrel and the screw plunger in the machine body receives a melt through the perforations of filter, which melt is a mixture of the materials subjected to the plasticizing. The melt enters continuously into the metering chamber in the form of a plurality of melt streams axially moving and rotating about the axis of the body, and causes an accumulated part of the melt in the chamber to be stirred or agitated in various directions including both radial and axial directions. That is, due to the filter of the present invention, the different materials in the metered melt are effectively admixed to such an extent that they are uniformly distributed in the metering chamber. In comparison with the present invention, the prior art filter mounted in the nozzle for effecting the melt filtration during the injection of the melt also functions as an agitator for the melt, but does not cause the melt to be stirred substantially in the axial direction. This is because the filtration is effected during the injection process, and thus a local leading part of the filtered melt is not allowed to be mixed with a following local part of the filtered melt in the axial direction, although local melt parts filtered at the same time may be mixed with each other due to the filter in the radial direction. In this connection, the nozzle filter of the prior art does not ensure a molded product to be provided with uniformly distributed materials in practice.

The mixing effect of the filter according to the present invention may be enhanced, if the melt streams through the perforations of the filter are forced to flow out along a shape of a cone tip head of the screw plunger. In this regard, it is preferable to have the filter mounted to the screw plunger at a position adjacent to and upstream of the cone tip head with the perforations being oriented axially but inclined along the slope face of the cone tip head.

BRIEF DESCRIPTION OF DRAWINGS

FIG. 1 is a cross-sectional diagram showing an injection molding apparatus of an internal pressure-holding chamber system incorporated with a melt filtering means according to the present invention;

FIG. 2 is a plan view of a perforated disk forming the melt filtering means, seen in a direction A in FIG. 1;

FIG. 9 is a cross sectional diagram showing another molding apparatus having a metering and filtering system and an internal pressure-holding chamber system corresponding to those shown in FIG. 1 and also comprising an independent injection system;

FIGS. 10A, 10B and 10C are cross-sectional views of an injection molding apparatus according to the present invention, showing another embodied melt filtering means incorporated with a screw plunger and a barrel, FIG. 10A showing plasticiging, filtering and metering processes, FIG. 10B showing an injection process, and FIG. 10C showing an impurity discharging process;

BEST MODE FOR CARRYING OUT THE INVENTION

Figure 3:
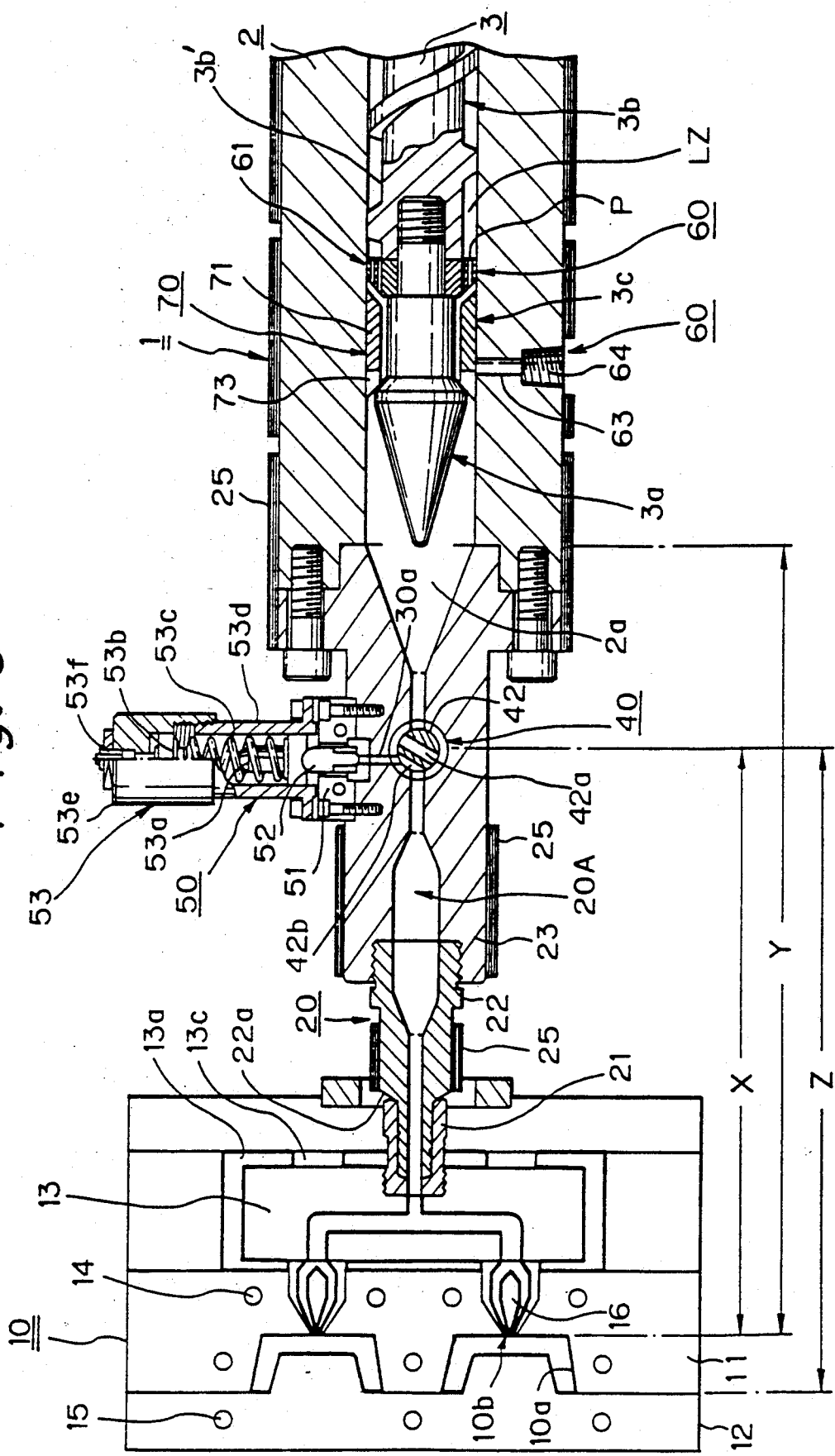
FIG. 3 is a cross-sectional diagram corresponding to FIG. 1, showing another injection molding apparatus of an internal pressure-holding chamber system and a remetering system in combination with a melt filtering means according to the present invention.

FIGS. 1 and 3 show first and second embodiments of apparatuses according to the present invention. Referring to FIGS. 1 and 3, each apparatus for injection molding of plastic material has a conventional single barrel type injection machine 1 and a mold arrangement 10 incorporated therewith. The machine 1 is axially movable for a suck-back operation and for injection, plasticizing and metering operations, and comprises a body forming a cylindrical barrel 2 having a screw plunger 3 therein, a hydraulic piston-cylinder (not shown) with a piston connected to the plunger 3, and a cylindrical hollow extension 20 extending forwardly from the barrel 2. The apparatus further comprises a hot runner mold 13 incorporated with a manifold. The hot runner mold 13 is incorporated in the mold arrangement 10 in a thermal-insulating manner involving an air spacer 13a and solid spacer 13c.

The cylindrical extension 20 is in direct contact with the hot runner mold 13 at its forward end, but is connected with the mold arrangement 10 at its forward end via a solid thermal insulator 13c.

The mold arrangement 10 comprises a stationary mold half 11 and a movable mold half 12. The stationary mold half 11 is connected to the hot runner mold 13. Both mold halves have cooling means 14 and 15, and define at least one cavity 10a for a molded article, which cavity has at least one gate 10b. The gate 10b has a pointed heat-generating module 16, such as a so called "spear", received therein to thereby have the module heat a cold part of the material at the gate temporarily and instantaneously with the effect that the gate is opened to the cavity for a next shot, after the suck-back step is completed.

The hot runner mold 13 and the module 16 incorporated therewith result in a runnerless article being molded.

The cylindrical hollow extension 20, which provides an exit passage, is divided into three parts, that is, a forward part 21 connected to the hot runner mold 13, an intermediate piston part 22 axially disposed in the forward part, and a rear part 23.

The rear part 23 forms a head portion of the barrel 2, and the intermediate piston part 22 forms a so called "nozzle" detachably connected to the head barrel portion 23. The cylindrical extension 20 is designed so that its hollow space has an enlarged diameter portion 20A, and is provided with band heaters 25 at its periphery.

The hot runner mold 13 and the cylindrical extension 20 of the machine 1 in combination form a hollow extension defining a nozzle passage Y communicating the interior of the barrel 2 with the cavity gate 10b.

The rear cylindrical extension part 23 is incorporated with a valve means 40. The nozzle passage Y provides an internal pressure-holding chamber X between the valve means 40 and the cavity gate 10b.

The intermediate piston part 22 of the cylindrical extension 20, as the "nozzle", consists of a cylindrical body and a circumferential flange 22a provided to work as a stopper against the forward part 21 at an abutting end face thereof, and also as a sealing means for preventing leakage of the hot material when the material is injected. An axial position of the nozzle 22 relative to the forward part 21 is fixed when the flange 22a abuts against the abutting end face of the forward part 21. The machine 1 with the nozzle 22 is sucked back by a predetermined stroke from the above position.

Referring to FIGS. 1 and 3, the valve means 40 comprises a driving means, for example, a pulse motor (not shown) mounted on the rear cylindrical part 23, and a circular valve rod 42 extending vertically from the motor. The rear part 23 has a vertically circular hole 30 crossing the nozzle passage Y. The valve rod 42 is rotatably disposed in the vertical hole 30, and has a horizontal through-hole 42a. The valve hole 42a forms a portion of the nozzle passage Y when the valve means 40 or the valve rod 42 is in an opened position. The valve rod 42 effects a nozzle passage interruption or a chamber closing against communication of the barrel 2 with the cavity 20a, when it is in a closed position.

Immediately after a plasticized and metered material (melt) is injected from the barrel 2 using the screw plunger 3 toward the mold cavity 10a through the nozzle passage Y, the valve means 40 is forced to a closed position by the pulse motor to effect the nozzle passage interruption and to thereby have a closed space Z, consisting of the mold cavity 10a and the chamber X, fixed in volume. As a result, most of the injected material is compacted in the closed and fixed space Z to thereby exert an internal pressure against the melt filled in the mold cavity 10a, which pressure is called an "internal holding pressure".

In marked contrast, a conventional pressure-holding chamber system, shown, for example, in U.S. Pat. No. 4,632,652, comprises a piston-cylinder device in association with a corresponding chamber X'. Upon a corresponding nozzle passage interruption, the piston-cylinder exerts an external pressure against the melt in a corresponding space Z' which is not fixed but variable in volume. In this regard, the conventional pressure-holding chamber system may be called an "external pressure-holding chamber system" relative to the "internal pressure-holding chamber system" as shown in FIGS. 1 and 3.

Both kinds of the pressure-holding chamber systems incorporated in the injection molding apparatuses have a common advantage relative to a universal non-pressure-holding chamber system where a holding pressure is exerted by an injection machine per se with a screw plunger. The common advantage resides in that a period of one shot cycle is considerably shortened, leading to an increased productivity. This is because, while an external or internal pressure-holding step is performed, the injection machine is allowed to perform a plasticizing and metering step for a next shot. Therefore, it is preferable to perform such plasticizing and metering step upon the nozzle passage interruption which is to be effected immediately after an injection step in order to minimize a period of one shot cycle in a continuing cyclic injection molding run.

The universal non-pressure-holding chamber system, where an external pressure-holding is performed by an injection machine per se using a screw plunger for use in the plasticizing and metering and the injection, is substantially equivalent to the external pressure-holding chamber system in that the pressure-holding relies on an external hydraulic driving source such as the injection machine (in the non-pressure-holding chamber system) or the additional piston-cylinder device (in the external pressure-holding system), and thus the external driving source is likely to cause the weight of a molded product to be varied due to an inevitable pressure variation in the external holding pressure.

In marked contrast, the internal pressure-holding chamber system is advantageous relative to both the above systems in that such a pressure variation as the above does not occur during the internal pressure-holding operation, and thus variation in the weight of a molded product is considerably decreased. In this regard, the internal pressure-holding chamber system can be used effectively in production of precision molded products with high productivity. In this case, generally speaking, it is preferable to have a ratio of a spacial volume of the chamber X to that of the entire mold cavity(s) designed so as to be around 1 or greater.

The first embodiment as shown in FIG. 1 has no other valve means other than the valve means 40, in association with the internal pressure-holding chamber X. The second embodiment as shown in FIG. 3, has an additional or second valve means provided in the chamber X for remetering the melt. That is, as shown in FIG. 3, the head barrel portion 23 is provided with a remetering means associated with the first mentioned valve means 40. The remetering means comprises a pressure-sensitive check valve 50 of a valve seat type in association with the first valve means 40. The valve rod 42 of the first valve means 40 has a groove 42b formed at its surface portion. The head barrel portion or the rear part 23 has an outlet hole 30a extending horizontally therefrom to open to the vertical hole 30 in such a position that the groove 42b communicates with both the chamber X and the check valve 50, when the first valve means 40 is in the closed position, and when the first valve means 40 is in the opened position, the horizontal outlet hole 30a is closed by the valve rod 42.

The check valve 50 comprises a cylindrical valve chamber 51, having a vertical or radial opening (not shown) for discharging the melt out of the system, a piston valve body 52 of a seat type, and means 53 for urging or biasing the valve body against the melt in the chamber X at a predetermined pressure. The biasing means 53 comprises an inner rod 53a abutting against the valve body 52, an outer rod 53b, coil spring 53c encircling both the rods and sandwiched by the rods, inner and outer threaded housing cylinders 53d and 53e screwed to each other to form a housing for the spring and rods, and a load cell or pressure sensor 53f connected to a free end of the outer housing cylinder 53e and extending inwardly to abut against the outer rod 53b at a rear end thereof. A force of the spring 53c is adjusted by screwing the outer housing cylinder 53e relative to the inner housing cylinder 53d. In this connection the load cell 53f is provided to detect the spring force or the predetermined pressure for the remetering.

The piston valve body 52 has a circumferential chamfered edge at its free end, which edge is to be forced by the spring 53c to abut against a counterpart circumferential outlet edge of the horizontal hole 30a. When the first valve means 40 is in the closed position, but a pressure of the melt in the closed space Z is not more than the predetermined pressure, the melt is prevented from being discharged from the discharging outlet of the second valve means 50 through the groove 42, the outlet hole 30a and the interior of the valve chamber 51, that is the second valve means 50 is kept closed. Of course, when the first valve means 40 is in the opened position, the second valve means 50 is kept closed irrespective of the melt pressure. When the first valve means 40 is in the closed position and if the melt pressure is over the predetermined valve, the second valve means 50 is forced by the melt pressure to be in the opened position against the force of the coil spring 53c to thereby allow an excess part of the melt in the space Z to be discharged out of the machine system through the above mentioned passage route until the remaining part of the melt in the space Z is balanced with or reduced to the predetermined pressure exerted by the coil spring 53c. As a result, the melt compacted in the space Z upon the nozzle passage interruption, which is effected by the first valve means 40 immediately after injection, is regulated to a predetermined pressure or metered to a predetermined amount (mass) with a possible excess part of the melt being discharged out of the system.

The above compacted melt is metered once in the barrel 2 in cooperation with the screw plunger 3 and then injected through the nozzle passage Y toward the mold cavity 10a. In this regard, the second valve means may be called the "remetering means". The remetered melt in the fixed and closed space Z consisting of the mold cavity 10a and the chamber X exerts an internal holding pressure against the mold cavity 10a.

According to the first embodiment, a non-remetered melt compacted in a corresponding space Z exerts a corresponding internal holding pressure as previously stated.

The remetering and internal pressure-holding chamber system as shown in FIG. 3 is advantageous, relative to the non-remetering internal pressure-holding system as shown in FIG. 1, in that an amount of the melt injected and compacted in the space Z, which amount is likely to vary due to an operational variation in the metering in every shot cycle, is remetered or regulated to a predetermined level so that the resultant or remetered melt, remaining in the space Z, has a reduced amount of variation. As a result, with the remetering system, the weight of variation in a molded product is more reduced than that with the non-remetering system, and thus the remetering system is more preferable in producing a precision molded article.

According to the present invention, each of the first and second embodied apparatuses as shown in FIGS. 1 and 3 has a melt filtering means 60 provided in the machine body, not the nozzle connected thereto, for filtering a plasticized material during the metering in the barrel 2 (the first metering relative to the second metering or remetering in the second embodiment).

The screw plunger 3 is of a conventional rod form with a helical screw thereabout, and has a tip head portion 3a, a main screw portion 3b and an intermediate portion 3c therebetween. The tip head portion 3a has an enlarged diameter local portion defining an annular space gap with the barrel 2 therebetween. This space gap allows the melt to flow over the tip head portion 3a into a forward spacial portion 2a therethrough. The intermediate plunger portion 3c, in combination with the tip head plunger portion 3a of a cone shape converging in an axially forward direction, forms a check valve 70 of a back-flow ring type which prevents metered melt from flowing back or rearwardly in the injection step.

The check valve 70 comprises a valve chamber defined by the barrel 2, the tip head portion 3a, a rod portion of the intermediate plunger portion 3c and a valve seat member 61 of a disk form connected to the plunger rod 3b' and a valve body member 71 of an annular form axially slidable in the valve chamber.

According to one embodiment of the present invention, the melt filtering means 60 comprises the valve seat member 61, which has circumferentially arranged perforations P of a round cross-sectional shape, and is slidably fitted to an inner surface of the barrel 2 so that the melt is allowed to flow forwardly through only the perforations P. The annular valve body member 71 is also slidably fitted to the barrel inner surface with an annular space gap between the valve body member 71 and the plunger rod portion, which space gap forms a valve passage. The valve passage is closed when the valve body member 71 closes the filtering perforations P of the valve seat member 61 with the valve body member 71 abutting against the valve seat member 61. The tip head portion 3a has a stopper for stopping a forward movement of the valve body member 71, and it in combination with the valve body member defines several outlet openings communicating with the valve passage. In connection with this, the perforations P of the valve seat member 61 may be called as "valve inlet openings", which communicate with the valve passage only when the check valve 70 is in an opened position.

The check valve 70 is provided to be opened for allowing a plasticized material or melt to flow forwardly therethrough, while a plasticizing and metering step is carried out with the screw plunger 3 being forced to rotate and move rearwardly against a back pressure by an increasing part of the melt which has passed through the check valve 70 and accumulated in the forward spacial portion 2a, a so called "metering chamber". The metering chamber 2a is variable in volume, and is defined by the tip head portion 3a, the check valve 70, the valve rod 42 of the first valve means 40 within both the nozzle passage and the interior of the barrel 2. That is, the metering chamber 2a is increased in volume during the so called "metering", which is carried out over a predetermined rearward stroke of the rotating and axially withdrawing screw plunger.

The check valve 70 is in a closed position, while the screw plunger 3 is in an injecting operation. In the closed position, the valve body member 71 is forced to abut at its rear end against the disk member or valve seat member 61 by the melt pressure, which is equivalent to an injection pressure, to thereby close the perforations P of the disk member 61.

The conventional main screw portion 3b of the plunger 3 is an axially extending plunger rod 3'b having a screw projection extending radially from a periphery of the plunger rod 3'b and extending helically about the plunger rod 3'b over its entire length.

According to the present invention, the melt filtering means 60 further comprises an impurity purging means. The purging means comprises a through-hole 63 formed in a cylindrical wall of the barrel 2 to extend horizontally as shown in FIGS. 1 and 3, and open to the atmosphere, and a threaded plug 64 to be detachably screwed into the purging hole 63. The purging hole 63 is located in an axial position so that it opens to a local zone of a plasticizing space in the vicinity of a rear face of the perforated disk member 61 when the screw plunger with the disk member fixed thereto is in the most forward position as shown in FIG. 1. At the most forward position, the screw plunger is forced to rotate, while it is axially fixed, to thereby have non-filtered or residual impurities or foreign materials accumulated on the rear face of the disk member discharged out of the machine system through the purging hole 63. This purging operation is performed intermittently during a long run operation, as needed.

With the perforated disk member 61, it is preferable to have a peripheral portion 61a extending radially from a level of a periphery of the plunger rod 3'b, which peripheral portion 61a has a conical face as the rear face, converging in a rearward direction as shown in FIG. 1 and being exposed to the plasticizing space, with a helical groove 62 formed thereon as shown in FIG. 2. The perforations P are arranged in the helical groove 62 therealong, and the purging hole 63 is located in the vicinity of a periphery of the conical rear face when the screw plunger 3 with the disk member 61 in the most forward position as shown in FIG. 1, where the screw plunger is prevented from moving forward any further by a stopper provided in the machine.

The perforations P may be designed to be as small in size as 0.7 mm or less and as low in number as 36 or less.

The filtering means 60 for use in association with the metering occurring in the machine body, or the barrel 2, as shown in FIGS. 1 and 3, is advantageous in that it enables the purging operation to be performed while an injection molding apparatus is kept together as a unit without being separated into two parts at the nozzle 22 contrary to the case of the prior art, and thus interruption of the injection molding run for the purging of the accumulated impurities is allowed to be shortened considerably in time, in comparison with the prior art case. In this regard, with the filtering means according to the present invention, the internal pressure-holding system is advantageous in that it can perform an injection molding with high productivity in not only a short run but also in a long run where the impurity purging is effected intermittently, compared with the universal non-chamber system incorporating the conventional filtering device.

The filtering means of the present invention mounted to the screw plunger is advantageous in the following aspects.

In a first aspect, the electric energy required to operate the injection molding apparatus is substantially the same as that required to operate a conventional apparatus involving a filtering means mounted to not the screw plunger but a nozzle located downstream of the metering chamber.

In a second aspect, a braking performance of the screw plunger against an inertial movement thereof to be exhibited due to the flow resistance of the melt having a high viscosity, when the driving of the screw plunger for rotation is stopped, or switched off at the end of the rearward measuring stroke, is enhanced with the effect that a rearward braking stroke of the screw plunger is decreased with considerably less stroke variation, compared with an apparatus with no such filtering means connected to the screw plunger. This reduced braking stroke variation results in more accurate metering of the melt to be injected in every shot cycle, leading to a reduced weight variation of a mold product, which is desired for molding a precision product.

In a third aspect, since the injection step is not subjected to any melt filtration, an injecting power required to attain the same high injection rate (for example, 70 g/sec) is equivalent to that required in a non-filtering apparatus, whereas a filtering apparatus having a nozzle incorporated with a filtering device requires a greater injecting power to attain the same high injecting rate.

Under the circumstances in the plastic molding industry where in consideration of production economy an injection molding apparatus is likely to be operated with a driving power as great as possible in order to produce as many molded articles as possible in every shot using a multi-cavity mold arrangement, such an increased injecting power as above is likely to require a more powerful injection machine, resulting in an increased machine cost. In this regard, the filtering of the present invention is advantageous, since it does not require such an increased injecting power to attain a desired high injection rate as in the above case.

That is, in the present invention any resistance to liquid flow due to filtering is in the rear stroke where less power is required, so the peak power load on injection is not increased.

In a fourth aspect, impurities clogging the perforated disk member 61 can be easily back-flushed or released from the perforated filtering member in the pressure-holding chamber system by performing the following process without disassembling the apparatus. With the first and second embodiments of the present invention as shown in FIGS. 1 and 3, the releasing operation can be performed as follows. The valve means 40 is intentionally closed so that the nozzle passage interruption is effected and during the intentional nozzle passage interruption a quasi-metering operation is performed to some extent and then is intentionally changed to a quasi-injecting operation with the effect that a metered melt in the metering chamber limited by the valve means 40 at one side thereof exerts a high pressure instantaneously against the impurities clogging the perforations P of the disk member 61 to remove the impurities rearwardly out of the perforations. The above impurity removing process may be repeated to complete the removal of the impurities as needed. In every releasing process, the impurities clogging the disk member 61 are forced to be subjected to the above rearward pressure which is high but lower than a normal injection pressure, during a very short period of time at least until the check valve 70 is closed with the valve body member 71 abutting against the perforated valve seat disk member 61 at the forward face thereof.

Fortunately, a pressure of the melt passing through the perforations P of the filtering disk member 61 during a metering process is considerably lower than a normal injection pressure of the metered melt. In this connection, even the above-mentioned lower pressure, to which the impurities in the perforations P are subjected in a rearward direction, enables the impurities to be removed from the perforations P in the same rearward direction.

In this releasing process, it is preferable to force the screw plunger 3 to move axially under pressure to the most forward position. This is because the below mentioned purging process can be carried out immediately after the releasing process by rotating the screw plunger 3 at the same most forward position thereof with the plug 64 being removed from the purging hole 63.

It is appreciated that the above impurity releasing process can be performed, thanks to the possible nozzle passage interruption which is allowed to occur in the pressure-holding chamber system.

In a fifth aspect, the impurities accumulated in a local zone facing the rear face of the perforated disk member 61 can be purged with some part of the melt in the plasticizing space in the barrel 2 through the purging hole 63 as needed. The purging is effected by rotating the screw plunger 3 at the most forward axial position thereof, while the purging hole 63 is opened. It is preferable to carry out the above-mentioned impurity removing process and the purging process in this order. The purging process can be carried out in a considerably short period of time without disassembling any part of the apparatus except for the plug 64 being removed from the purging hole 63. In this connection, reduction of the working ratio or productivity in a long molding run due to the purging process being repeated as needed is suppressed or considerably improved in comparison with that in the case of the conventional melt filtration occurring at the nozzle during the injection step.

Figure 4:
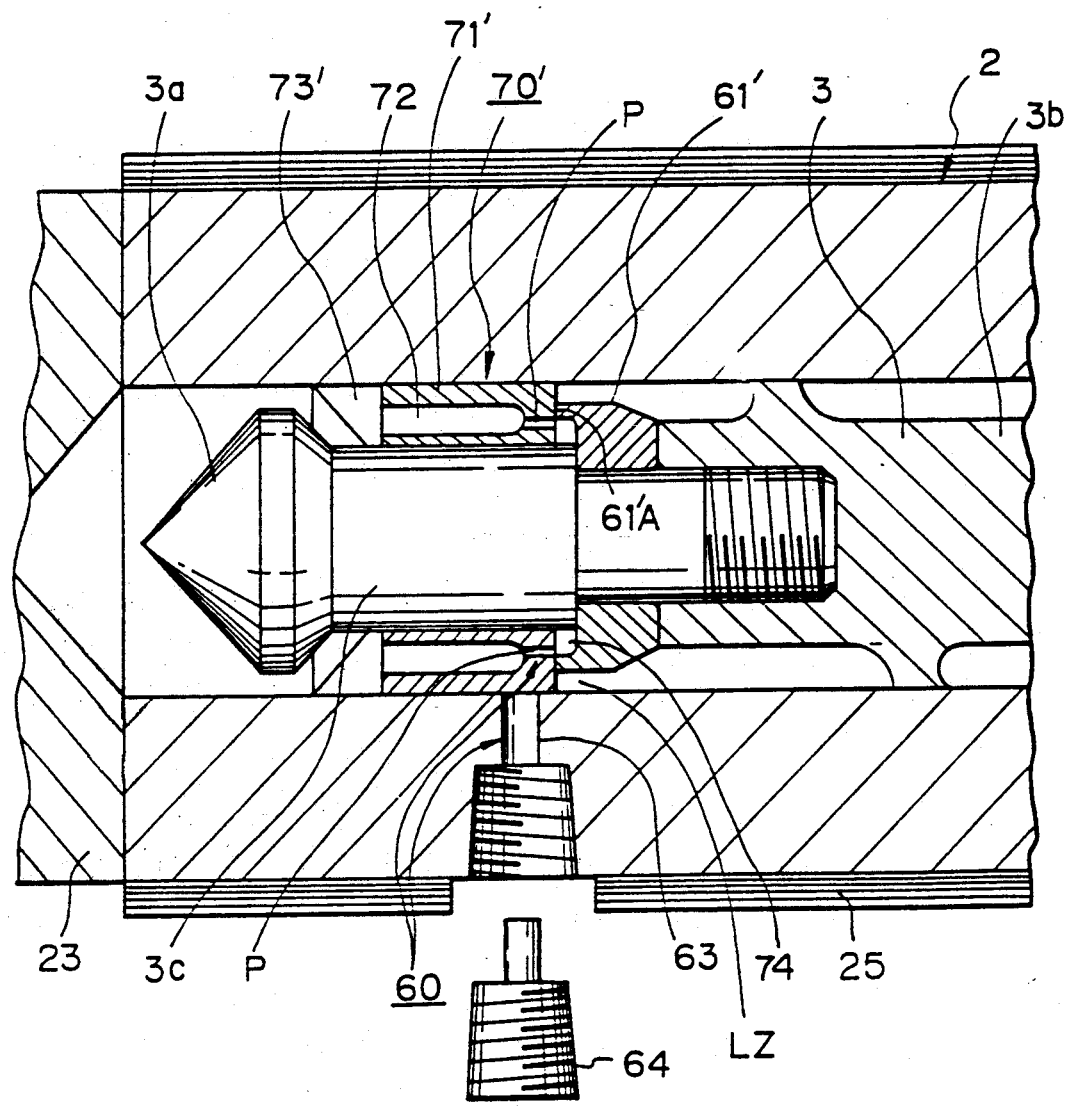
FIG. 4 is a cross-sectional view of a portion of an injection molding apparatus corresponding to those shown in FIGS. 1 and 3, showing an embodied combination of a check valve of a back-flow ring type and a melt filtering means according to the present invention.

FIG. 4 shows another embodiment of an injection molding apparatus, which is different from the apparatuses shown in FIGS. 1 and 3 in only the following features. The apparatus as shown in FIG. 4 has a check valve 70' comprising; a circumferential solid or non-perforated disk member 61' providing a valve seat; a perforated movable annular member 71' forming a valve body; and a section of a screw plunger 3. The valve body 71' is slidably contacted with or fitted to an internal circumferential surface of a barrel 2 and a peripheral rod surface of the plunger section so that it is axially movable relative to the screw plunger section. The disk member 61' is fixed to the screw plunger and defines an annular space gap between the barrel and its periphery. The valve body 71' has an annular groove 72 axially extending in a rearward direction from a forward surface of the valve body, and many axial perforations P for melt filtration open to both the annular groove 72 and a rear surface of the valve body forming an abutting face against the valve seat. The disk member 61' has a forwardly extending circumferential projection 61' A which provides the valve seat of a circumferential form and defines an annular recess about the screw plunger. The valve seat or circumferential projection 61' A is positioned so that it can abut against a peripheral or outer portion of the rear valve body surface and the annular recess can cover all of the perforations 61' with a local space zone 74, when the check valve 70' is in a closed position, to thereby have the valve body perforations 61' interrupted from communicating with a plasticizing space defined between the barrel 2 and a main screw portion of the screw plunger. This design of the annular valve seat projection 61' A relative to the valve body perforations P is intended not to have the filtering perforations P closed directly by the annular projection 61' A. Otherwise, there may be an undesired occurrence of impurities of a relatively large size contained in the melt being pushed into the perforations when the check valve is closed. A tip head portion 3a of the screw plunger 3 forms a stopper for stopping a forward axial movement of the valve body 71'. This stopper and notched grooves formed in a peripheral surface of the valve body at a forward end thereof define several outlet openings 73' of the check valve 70'. In an opened position, the check valve 70' allows the melt to flow forwardly from the plasticizing space to a metering chamber through the perforations P and the outlet openings 73'.

Briefly stated, the difference between the apparatuses shown in FIG. 4 and FIG. 1 or 3 resides in that the former apparatus incorporates the check valve 70' which is designed to have the perforated valve body member 71' exert a melt filtering function, whereas the latter apparatus is designed to have the perforated valve seat member 61 exert the same melt filtering function.

The apparatus having the filtering check valve 70' as shown in FIG. 4 has the same advantages as those of FIGS. 1 and 3, but is more advantageous in comparison with an apparatus as shown in FIG. 1 or 3 as well as with a conventional injection molding apparatus provided with no filtering check valve in that the perforated filtering valve body 71' of FIG. 4 causes the check valve 70' to be closed quickly upon the screw plunger 3 commencing a forward axial movement for injection. In other words, with the check valve 70', an operational period of time from the opened position to the closed position is decreased or shortened. This quick closing action taken by the perforated valve body 71' improves an injection operation of the screw plunger, so that a weight variation of a molded product is considerably reduced. In this regard, the check valve 70' having the perforated filtering valve body 71' is more preferable for use in producing a precision molded article in a long run with high productivity. This preference is enhanced with the internal pressure-holding chamber system as shown in FIG. 1 or 3 being incorporated with the check valve 70' as shown in FIG. 4.

The apparatus with the check valve 70' incorporated therein as shown in FIG. 4 has a purging hole 63 and a plug 64 corresponding to those of the apparatus shown in FIG. 1 or 3. However, the corresponding purging hole 63 is axially positioned so that it opens to the local space zone 73 in the vicinity of the rear surface of the perforated valve body 71' between the valve body and the non-perforated valve seat member 61', when the screw plunger is in the most forward position with the check valve being in the opened position. In this connection, the melt with impurities accumulated on the rear perforated surface of the valve body 71' can be discharged out of the machine system through the purging hole 63 by rotating the screw plunger at the most forward position thereof.

From the forgoing, it will be appreciated that there may be various other embodiments of the melt filtering means within the scope of the present invention. Some of the other embodiments are shown in FIGS. 5 to 8, respectively. In FIGS. 5 to 8, the same or equivalent elements or members as those in FIGS. 4 are demoted by the same numerals, respectively.

Figure 5:
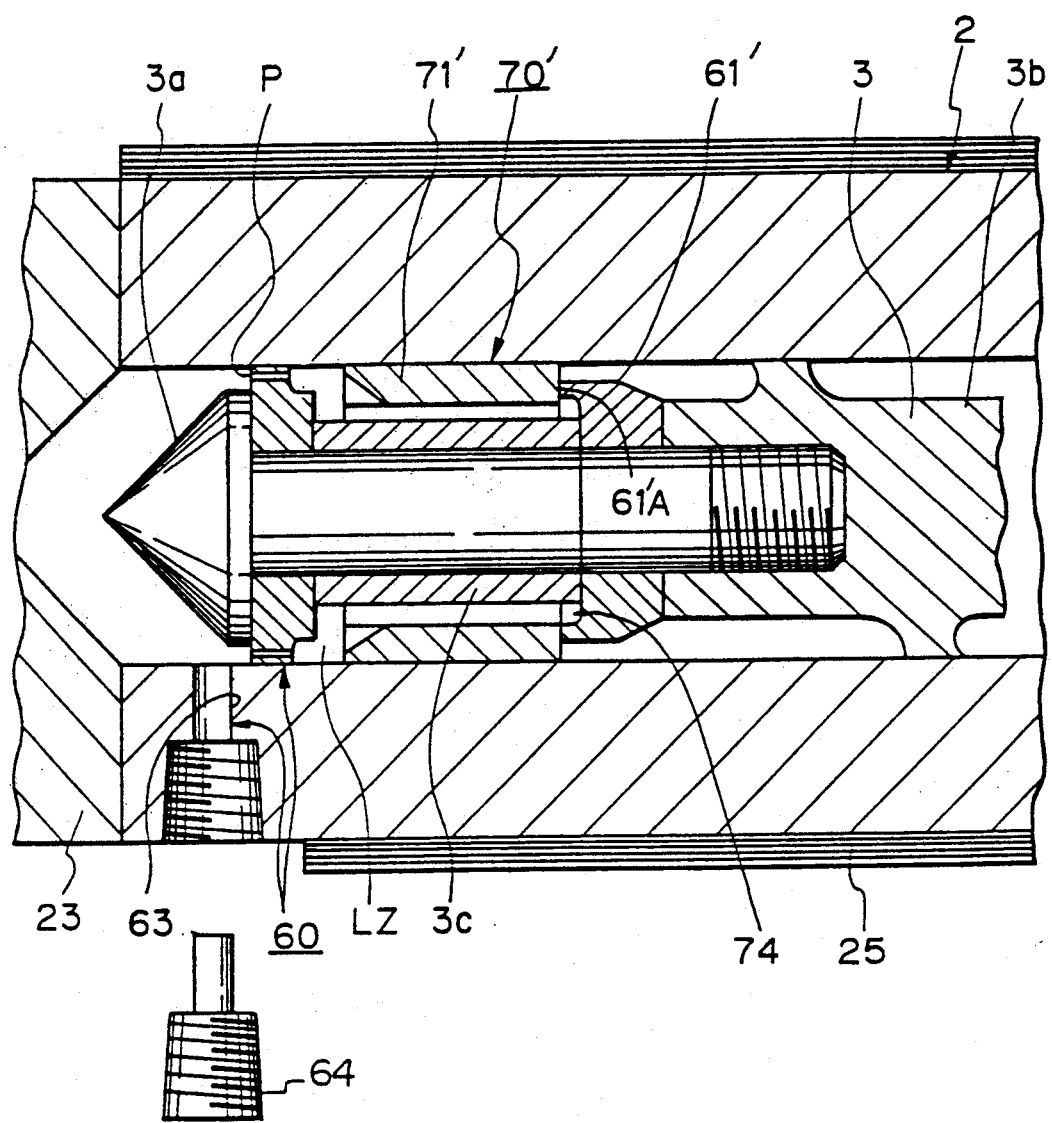
FIGS. 5 and 6 are cross-sectional views, each of a portion of an injection molding apparatus corresponding to FIG. 4, showing another embodied combination of a check valve of a back-flow ring type and a melt filtering means according to the present invention.

Referring to FIG. 5, the melt filtering means comprises a perforated member 80 and a purging hole 63 formed in the barrel 2 for discharging the accumulated impunities with the melt. A check valve 70' of a backflow ring type comprises front valve abutment members 80 and a rear valve seat member 61' of an annular form and a valve body member 71' of an annular form located therebetween and slidably fitted to an inner surface of the barrel 2. The front valve abutment member 80 is mounted to a rod portion of the crew plunger 3, and located upstream of and adjacent to a tip heat portion 3a of the screw plunger 3, and forms the above mentioned perforated member, which gas circumferentially arranged perforations P for the filtration and metering.

Figure 6:
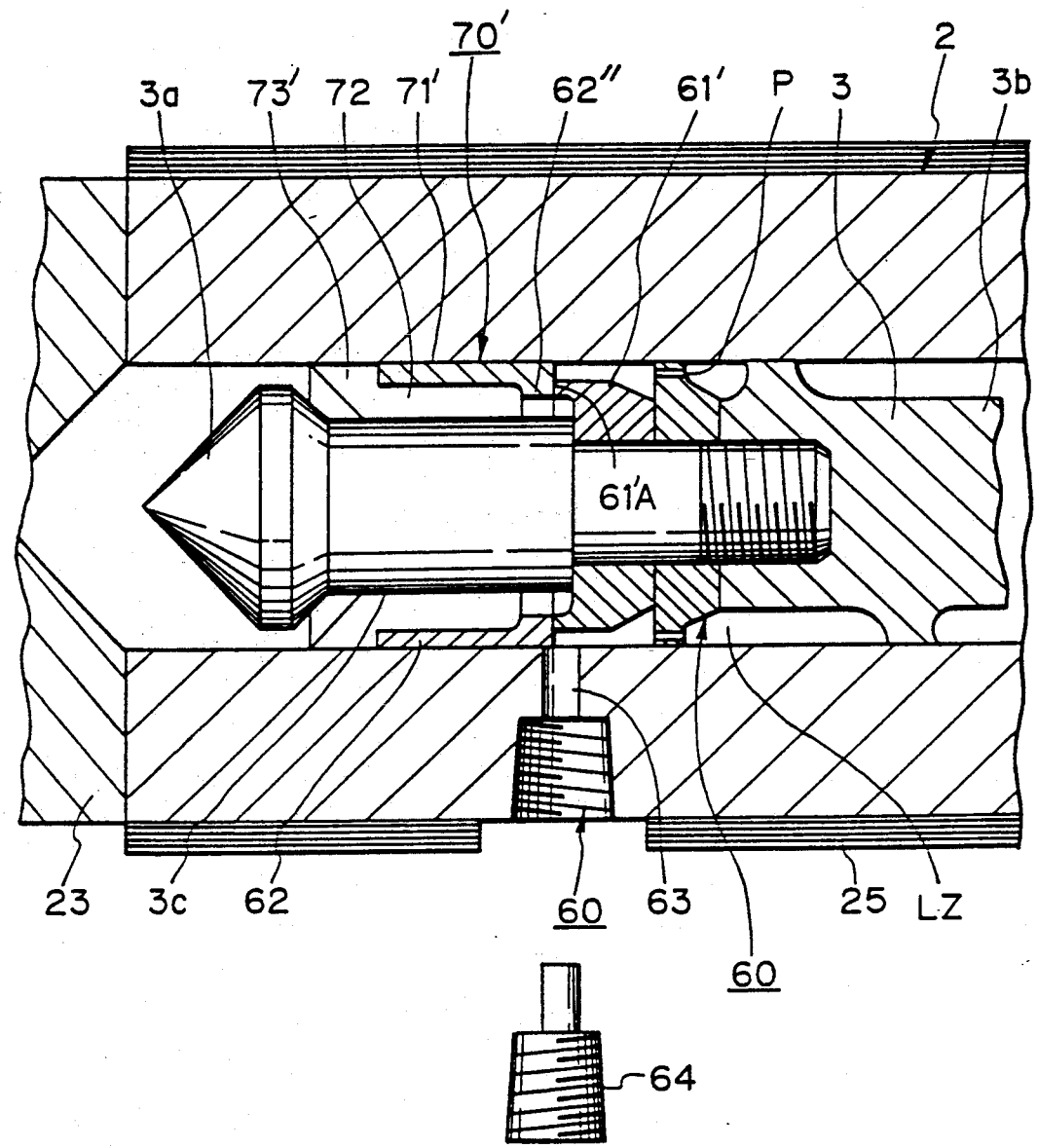

Referring to FIG. 6, a check valve 70' of a back-flow ring type is the same as that of FIG. 4 in that a tip head portion 3a of the screw plunger 2 forms a front valve seat member, but is different from that of FIG. 4 in that a valve body member 71' has through-holes P defining not perforations for the filtration but inlets of the check valve. The melt filtering means comprises a perforated member 81 and a purging hole 63 formed in the barrel 2 for discharging the accumulated impurities with the melt. The perforated member 81 is of an annular form mounted to a forward end of the main screw plunger portion and is located adjacent to and upstream of a rear valve seat member 61'. The perforated member 81 is slidably fitted to an inner surface of the barrel 2 and has circumferentially arranged perforations P for the filtration. The filtered melt is flown into the check valve for the metering.

Figure 7:
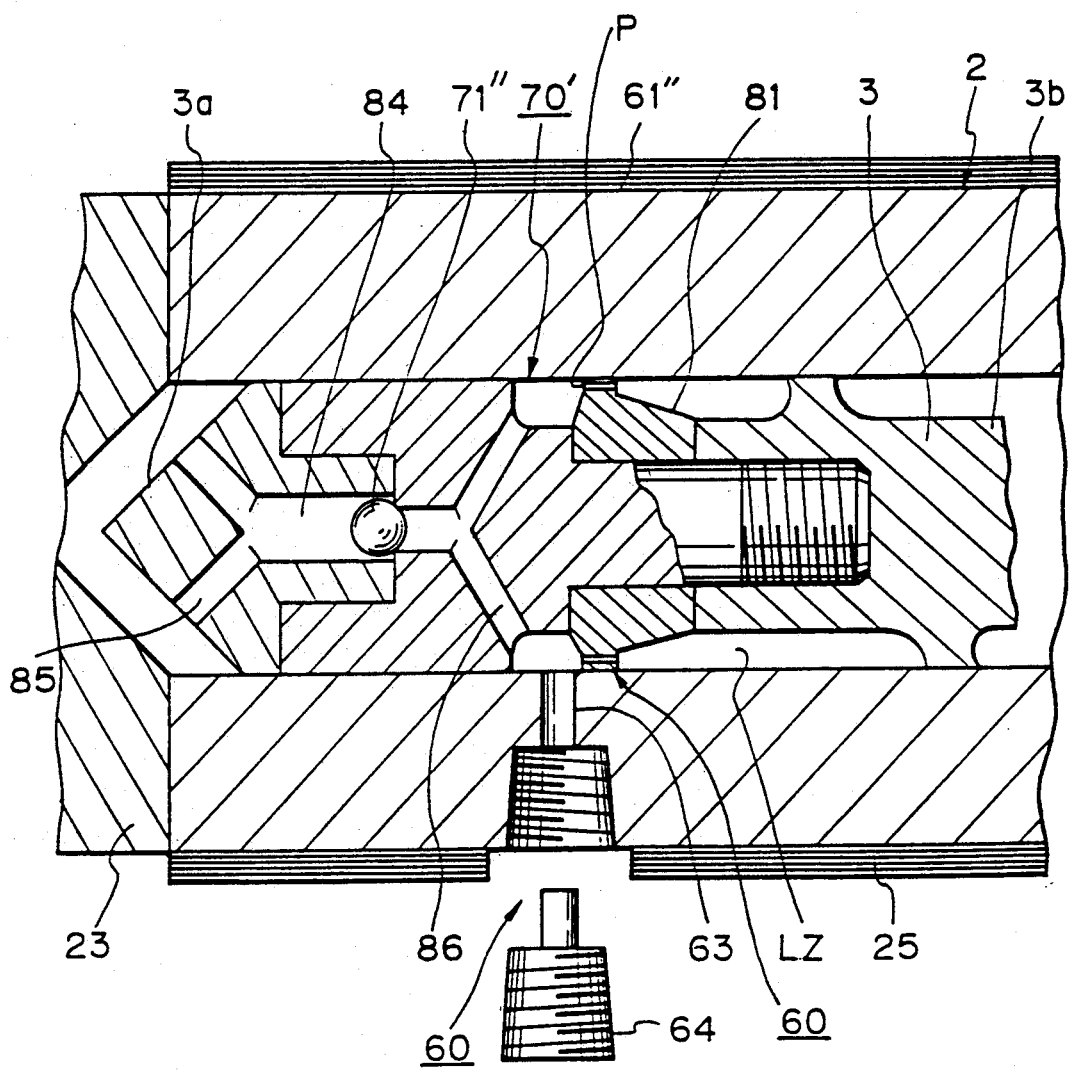
FIGS. 7 and 8 are cross-sectional views, each of a portion of an injection molding apparatus, corresponding to FIG. 4 or FIG. 5, showing another embodied combination of a check valve of a ball check type and a melt filtering means according to the present invention.

Referring to FIG. 7, a check valve 70' is of a ball check type, and comprises a front valve abutment member, a rear valve seat member 61'', and a valve body member forming a ball 71''. The front valve abutment member provides a tip head portion 3a of the screw plunger 3. The front valve abutment member and rear valve seat member in combination form a valve chamber 84 with inlet and outlet passages 85, 86 communicating therewith.

The ball 71'' is designed so as to have a diameter smaller than that of the valve chamber 84 so that there is a substantial radial space gap between the ball and the valve chamber. The ball 71'' is disposed in the valve chamber 84, and it is allowed to rotate and be slidebly movable with the radial space gap between both the inlet and outlet passages so that it closes the inlet passages 86 in a closed position of the check valve, whereas it opens both the inlet and outlet passages in an opened position of the check valve.

The melt filtering means comprises a perforated member 81 corresponding to that of FIG. 6 and a purging hole 63 formed in the barrel 2 for discharging the accumulated impurities with the melt. The filtered melt is forced to flow toward the check valve for the metering.

Figure 8:
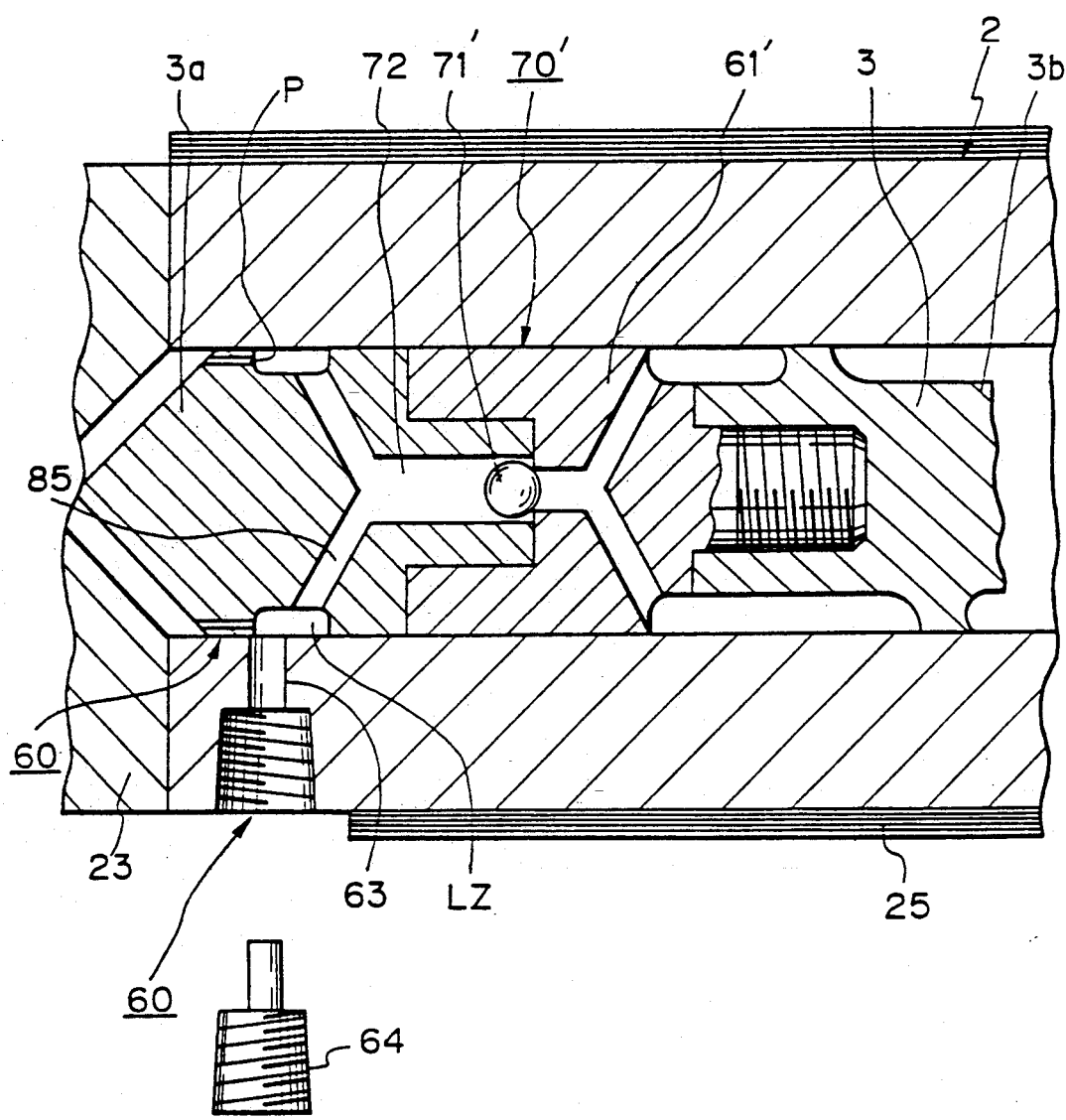

Referring to FIG. 8, a check valve of a ball check type is substantially the same as that of FIG. 7, except for a front valves abutment forming a tip head portion 3a of the screw plunger. In this case, the melt filtering means comprises a perforated member forming the tip head portion 3a or the front valve seat, and a purging hole 63 for discharging the accumulate impurities with the melt. The perforated member has circumferentially arranged perforations P for the filtration during metering. The purging holes 63 of the melt filtering means as shown in FIGS. 5 to 8 are all designed so as to be in an axial position so that in each case the purging hole opens to a local zone LZ of a plasticizing space in the vicinity of a rear face of the perforated member when the screw plunge 3 is in the most forward position in the barrel 2. At the most forward position, the screw plunge 3 is forced to rotate, while it is axially fixed, to hereby have non-filtered or residual impurities or foreign materials accumulated on the rear face of the perforated member discharged out of the machine system through the purging hole 63.

Referring to FIG. 9, the referenced parts 1 to 73 are described in relation to FIG. 1. The cylindrical barrel 2 is connected by an exit passage 87 provided with a valve 88 to a second cylindrical barrel 89. The barrel 89 is connected by passage 90 to the valve means 40. With the valve 88 shut plastic material is plasticized, metered and filtered in barrel 2 as described with reference to FIG. 1. Valve 88 is then opened and the plasticized material is transferred through passage 87 into the barrel 89. Valve 88 is then closed and the plastic material is injected by forward movement of the plunger 91 through open valve 40 into the mold arrangement 10. Back-flushing and purging of the filtering means 60 is carried out when necessary as described with reference to FIG. 1, except that, in this embodiment, valve 88 can be closed when removing impurities clogging the filter.

Although FIGS. 1 to 9 all indicate screw plugs 64 as means for closing and opening the purging holes 63, these plugs may, of course, be replaced by conventional shut-off valves or the like.

Figure 10B:
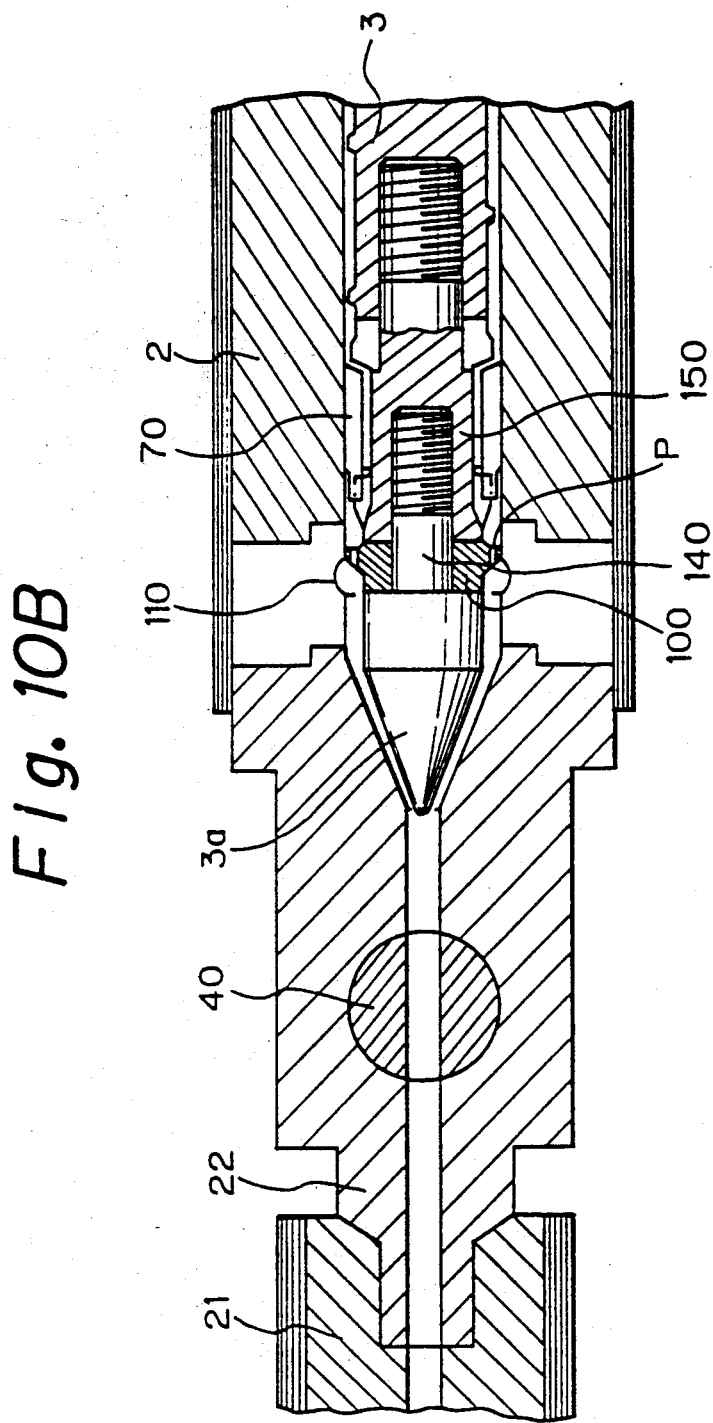
Figure 10C:
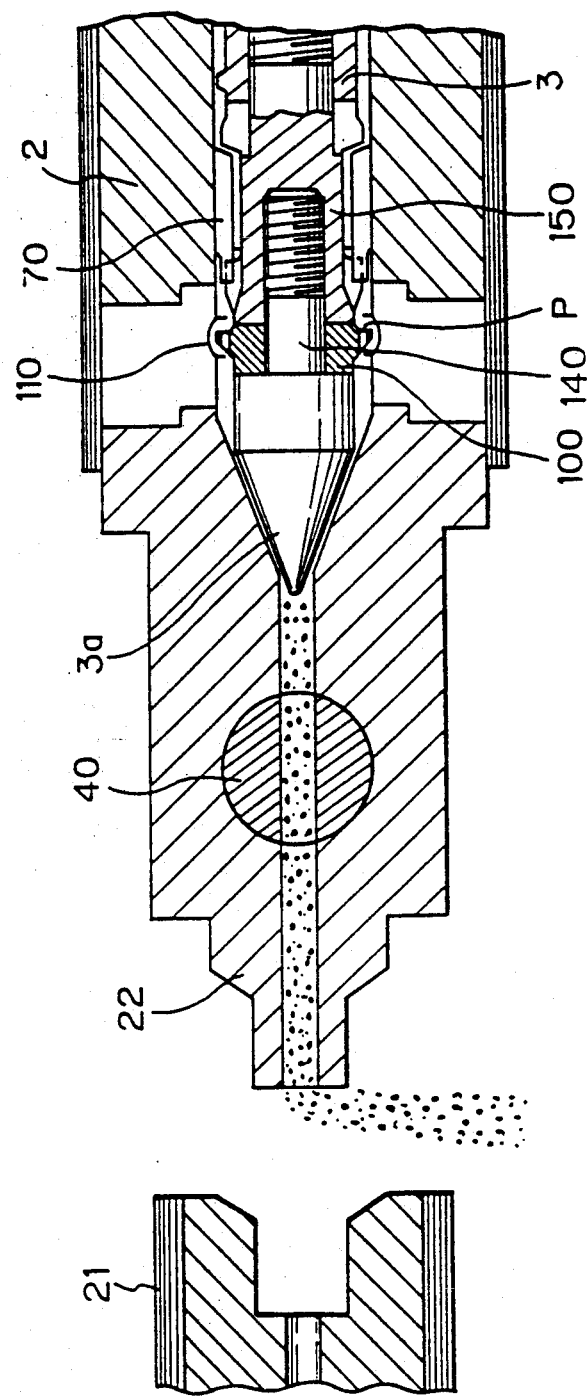

FIGS. 10A to 10C show another embodiment of the injection machine effecting melt filtration during metering of a plasticized material or melt.

This embodied machine is the same as that of FIG. 1 except for the following features. A filter 100 of this embodiment is mounted to a screw plunger 3 at a position between a cone tip head 3a of a screw plunger 3 and a check valve 70, that is the filter 100 is not incorporated in the check valve 70. The machine is further different from that of FIG. 1 in that no discharging hole is formed in a wall of a barrel 2, but an annular recess or groove 110 is formed at an inner surface of the barrel 2. An axial position of the recess 110 is determined so that the recess covers the filter 100 with a by-pass passage or space gap between a periphery of the filter and an anular bottom face of the recess, when the screw plunger 3 is in the most forward position.

In a purging operation for removal of the accumulated impurities behind or upstream of the filter 100, a nozzle 22 is intentionally detached from another part 21 of a hollow extension forming a nozzle passage with a valve 40, and also the valve 40 is opened as shown in FIG. 10C, while the screw plunger 3 is intentionally shifted in the most forward position. In this state, the screw plunger 3 is intentionally rotated with the result that the melt with the accumulated impurities is discharged from the nozzle 22 through the by-pass passage provided at the recess 120. The purging means of this embodiment is disadvantageous in comparison with that of FIG. 1 in that the purging operation requires detachment of the nozzle 22, from the counterpart 21, but is advantageous in the following respect.

The purging hole 60 of FIG. 1 has a weak point in that it is likely to be damaged at its inner edge due to rotation of the screw plunger. Therefore, it is required to reinforce the hole at the inner edge thereof by a special treatment, for example a titanum coating treatment, whereas no such damage as the above occurs in the case of FIG. 11A.

The detachment of the nozzle 22, however, is disadvantageous in that an intermittent stopping of a continuous long run take a longer time than in the case of FIG. 1 using the purging hole 63, since the nozzle detachment requires a resetting time for continuing the long run.

The melt filtration effected during the metering of the plasticized material or melt using the filter mounted to the screw plunger causes the filtered melt to be effectively stirred in a metering chamber variable in volume defined between the valve 40 and the screw plunger 3 moving rearwardly against a back pressure. The stirring of the metered melt occurs in various directions including radial and axial directions due to a plurality of melt streams flowing into the metering chamber with the following relationship between a linear velocity of each melt stream and that of the metering chamber expanding rearwardly.

Assuming that $S_1$ is a total cross-sectional area of the filter perforations, $S_2$ is a cross-sectional area of the metering chamber, and V is a rate of the metering (volume of the melt per second), a linear velocity of the melt streams ($v_1$) is represented as follows:

$$\vec{v_1} = V/S_2. \tag{v_2}$$

A linear velocity of the metering chamber ($V_2$) is represented as follows:

$$\vec{v_2} = -V/S_2.$$

A stirring ability A may be represented as follows:

$$A = |\vec{v_1} - \vec{v_2}|/|\vec{v_2}|$$
$$= S_2/S_1 + 1$$

In the case of a conventional melt filtration effected during injection of the metered melt using a filter incorporated in a nozzle, a corresponding stirring ability A' may be represented as follows:

$$A' = |\vec{v_1}' - \vec{v_2}'|/|\vec{v_2}'|$$
$$= S_2'/S_1' - 1$$

where: V' is an injection rate of the melt (volume/second); $\vec{v_1}'$ is a linear velocity of melt streams flowing out of perforations of the conventional filter having a cross-sectional area $S_1'$ in total; $\vec{v_2}'$ is a linear velocity of the melt at an outlet of the nozzle having a cross-sectional area $S_2'$; and $$\vec{v_1}' = V_1/S_1' \text{ and } \vec{v_2}' = V/S_2'$$

The stirring ability as defined above may be considered analogically to be stirring bars inserted axially into the accumulated static melt.

In comparison of both the stirring abilities, it is apparent that:

$A = S_2/S_1 + 1 > A' = S_2'/S_1' - 1$, since $S_2$ is much larger than $S_2'$, even if $S_1$ is assumed to be the same as $S_1'$.

With no filter provided, $S_2 = S_1$ and $S_2' = S_1'$, thus $A = 2$ and $A' = 0$. This means that the metering chamber (with no filter) inherently exhibits a stirring effect to some extent, while the nozzle (with no filter) never inherently exhibits the same effect.

The stirring ability is naturally enhanced due to an increase in the member of the filter perforations.

Further, the stirring ability is enhanced, in the metering filtration, due to impingement of the filtered melt streams against the valve 40 provided for the pressure-holding, whereas such an impingement as above does not occur in the injecting filtration using the nozzle filter with no valve provided downstream of the nozzle.

Still further, the stirring ability is enhanced in the metering filtration due to rotation of the filtered melt streams about the screw plunger 3, whereas such a rotation as above does not occur in the injection filtration.

Figure 11:
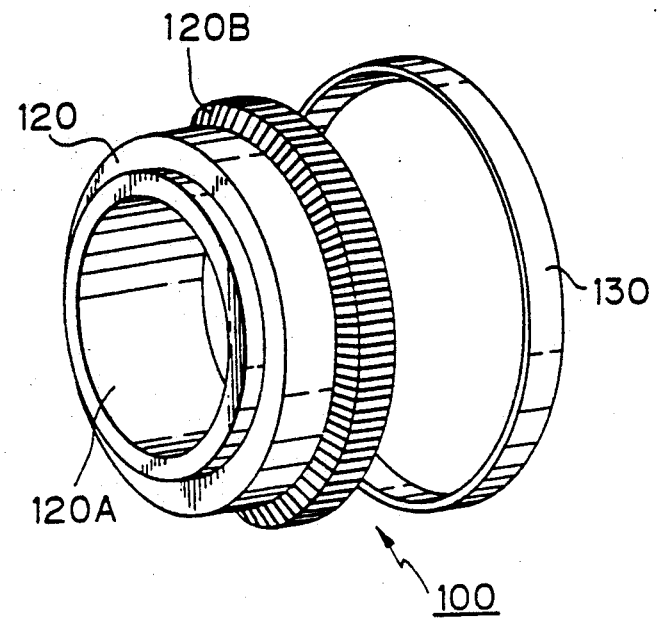
FIG. 11 is an exploded perspective view of parts forming the filter as shown in FIGS. 10A to 10C.
Figure 12:
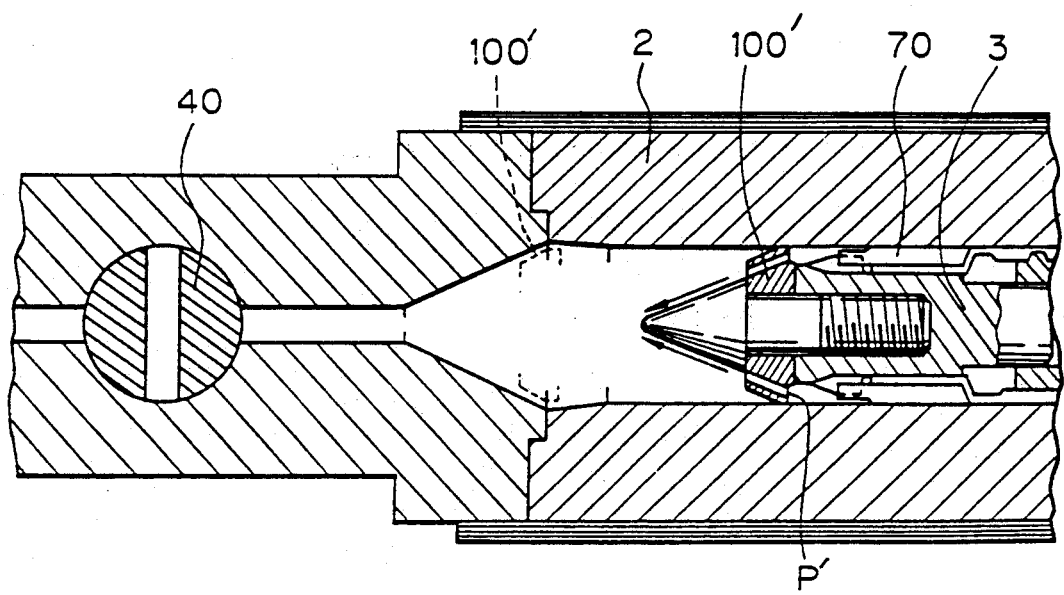
FIG. 12 shows another embodiment of an injection molding machine according to the present invention with a filter modified from that of FIGS. 10A for enhancing a stirring ability of the melt filter.

Still further, the stirring ability is enhanced in the metering filtration, if the filter 100 of FIGS. 10A to 11C modified as shown in FIG. 12. Referring to FIG. 12, a screw plunger 3 is provided with a filter 100' forming a rear section of a tip head 3a of a cone shape downstream of a check valve 70 with perforations P' designed so as to originate along the slope of the cone tip head 3a. According to the modified filter 100', the filtered melt streams as indicated by F are forced to flow so as to intersect the axis of the barrel 2 or the metering chamber with the effect that a turbulent flow of the accumulated melt in the chamber occurs at an inner part of the melt. In this modified embodiment, a recess 110' corresponding to the recess 110 of FIG. 10A for purging the accumulated impurities is formed at a forward portion of the interior of the barrel having the same inner diameter over the length, so that the filter can be covered by the recess 110' at the most forward position of the screw plunger 3.

Referring to FIG. 10A and FIG. 11, the filter of the present invention may comprise two parts. One of the parts is an inner disk 120 having a bore 120A. The other part is an outer ring 130, having an inner diameter small enough to be in tight contact with the disk 120 at a periphery thereof and an outer diameter large enough to be silidably fitted to an inner surface of a uniform diameter section of the barrel 2 upstream of the recess 110. The disk 120 has a plurality of grooves 120B formed at its periphery and extending axially to provide openings between its opposite surfaces. The grooves 120B have the same size with a basically rectangular cross section, which has a peripheral width and a radial depth. Preferably the radial depth is longer than the width. The grooves 120B are equally spaced around the periphery of the disk 120.

The disk 120 is combined with the outer ring 130 to form the filter 100 with the grooves 120B and the ring 130 in combination defining the perforations P for filtration The ring 130 may be fixed to the disk 120 by a heat treatment. The filter 100 is fixed to the screw plunger 3 such that it is sandwitched by a forward section of the screw plunger 3 having a threaded bolt extension 140 and a rear section of the screw plunger forming a threaded nut portion 150 with the bolt extension 140 passing through the bore 120A of the filter and screwed into the nut portion 150.

As apparent from the forgoing, the filter according to the present invention may be used as not only a means for melt filtration but also a melt mixer. In this regard, the claimed scope of the present invention covers not only an injection molding apparatus with the filter intended for melt filtration but also that intended for melt stirring or mixing, although the claims recite "melt filtration".

I claim:

1. A process of injection molding with melt filtration in a series of shot cycles, using an injection machine having a body provided with an injection screw plunger therein and a hollow extension, comprising a nozzle therefrom forming a nozzle passage, and a mold arrangement defining a cavity, the mold arrangement incorporated with the machine to communicate between the interior of the machine body and the mold cavity via the nozzle passage, the process comprising steps of:

having a plastic material, in every shot cycle, plasticized and metered while being heated within the machine body;

having the hot plasticized material injected under pressure toward and into the mold cavity through the nozzle passage; and having the hot injected material held at least partially within the entire mold cavity under pressure while the mold arrangement is being cooled to thereby provide and freeze a molded article therein, wherein said plasticizing and metering step is carried out such that the plasticized material is subjected to said melt filtration during the metering by passing the plasticized and metered material through a filter, the filter being mounted to a plasticizing and metering screw plunger, characterized in that the melt with impurities accumulated adjacent and upstream of the filter is intentionally discharged from the machine body, when the filter is in a predetermined position with the screw plunger being intentionally rotated to move the melt with impurities toward the predetermined position, and with the machine body being provided with a by-pass passage at said position through which the melt can pass by the filter for discharge out of the machine body.

2. A process of injection molding with melt filtration according to claim 1, wherein said by-pass passage is provided by a radial recess formed at an inner surface of the machine body, and the melt is discharged from an axial outlet of the machine body defined by said nozzle through said recess where the melt is allowed to axially pass over the filter.

3. A process of injection molding with melt filtration according to claim 1, wherein said by-pass passage is provided by a radial hole formed in the machine body, and the melt is discharged from said radial hole at a position in the vicinity and upstream of the filter, when said radial hole is intentionally opened.

4. A process of injection molding with melt filtration according to any one of claims 1 to 3, wherein: the nozzle passage is interrupted midway therealong from communication between the interior of the machine body and the mold cavity, after said injection step but while said material pressure-holding step is being carried out; and upon or after said nozzle passage interruption, said plasticizing and metering step is carried out by the injection machine for a next shot or injection with the plasticized material subjected to said melt filtration during said pressure-holding step.

5. A process of injection molding with melt filtration according to claim 4, wherein in said pressure-holding step a closed space consisting of the cavity and a forward portion of the nozzle passage leading thereto is fixed in volume with said nozzle passage interruption to thereby have the injected material compacted therein exert an internal holding pressure.

6. A process of injection molding with melt filtration according to claim 5, wherein the material compacted in said fixed closed space in each shot is adjusted to a predetermined value in amount upon or after said nozzle passage interruption by discharging a possible excess part of the compacted material out of the machine system.

7. A process of injection molding with melt filtration according to claim 4, wherein:

a piston-cylinder is used in association with said nozzle passage so that a closed space variable in volume according to a piston stroke is defined by a combination of the cavity and said nozzle passage, or said combination with said piston-cylinder, with said nozzle passage interruption; and in said pressure-holding step the injected material compacted in said closed variable space is subjected to an external holding pressure by said piston-cylinder upon said nozzle passage interruption.

8. A process of injection molding with melt filtration according to claim 1, wherein said melt filtration is effected using a perforated filtering means which is likely to clog with impurities, and while said nozzle passage interruption is intentionally effected, the plasticized material is pressurized against the closed valve means by an instantaneous forward axial movement of the metering screw plunger to thereby have possible impurities clogging the perforated filtering means pressurized rearwardly in order to release the perforated filtering means from the clogging.

9. A process of injection molding with melt filtration according to claim 1, wherein the plasticizing and metering screw plunger also serves as an injection screw plunger by axial movement in a direction opposite to that of the metering movement.

10. A process for injection molding with melt filtration, comprising the steps of:

providing an injection molding machine having a machine body for receiving a material to be heated, plasticized and metered;

providing a plasticizing and metering screw having a filter mounted thereon, the plasticizing and metering screw being controllable to move axially through the machine body to plasticize and meter the material and to rotate about its axis to cause movement of material relative to the machine body;

heating the material received within the machine body;

utilizing the plasticizing and metering screw to plasticize and meter the heated material by moving the plasticizing and metering screw axially through the machine body in a metering direction;

utilizing the axial movement of the plasticizing and metering screw to cause the heated material to pass through the filter during metering of the heated material, to filter and remove impurities from the heated material and accumulate the impurities on an upstream side of the filter;

providing a by-pass passage in the machine body for discharge of the accumulated impurities from the machine body, the by-pass passage being arranged at a position in the machine body to cause the accumulated impurities to by-pass the filter and discharge from the machine body through the by-pass passage when the plasticizing and metering screw is positioned at a preselected impurities discharge position and the impurities are caused to flow axially within the machine body; and rotating the plasticizing and metering screw about its axis when the plasticizing and metering screw is positioned at the preselected impurities discharge position to cause the accumulated impurities to flow axially within the body, by-pass the filter and discharge from the machine via the by-pass passage.

11. A process for injection molding with melt filtration, comprising the steps of:
providing an injection molding machine having a machine body for receiving a material to be heated, plasticized and metered;
providing a plasticizing and metering screw having a filter mounted thereon, the plasticizing and metering screw being controllable to meter the material;
utilizing the plasticizing and metering screw to plasticize and meter the heated material by moving the plasticizing and metering screw axially through the machine body in a metering direction;
utilizing the axial movement of the plasticizing and metering screw to cause the heated material to pass through the filter during metering of the heated material, to filter and remove impurities from the heated material and accumulate the impurities;
providing a by-pass passage in the machine body for discharge of the accumulated impurities from the machine body, the by-pass passage being arranged at a position in the machine body to cause the accumulated impurities to by-pass the filter and discharge from the machine body through the by-pass passage; and
purging the impurities from the machine body by causing the impurities to flow through the by-pass passage.

12. An injection machine for molding with melt filtration having a body provided with means for plasticizing, metering and injecting plastic material, the means for plasticizing comprising a screw rotatable in a cylindrical barrel,
characterized in that the screw is provided at its forward end with a filter for filtering impurities from the plasticized material as it is metered, and the cylindrical barrel is provided with a purging hole with means for opening and closing the hole, the hole being in a position which, in a purging operation for removal of the filtered impurities from the machine is adjacent the upstream side of the filter.

13. An injection machine for molding with melt filtration having a body provided with means for plasticizing, metering and injecting plastic material, the means for plasticizing comprising a screw rotatable in a cylindrical barrel, and a nozzle connected to the body,
characterized in that the screw is provided at its forward end with a filter for filtering impurities from the plasticized material as it is metered, and the cylindrical barrel has an annular recess at its inner surface, the recess being in a position where, in a purging operation of removal of the filtered impurities from the machine through a nozzle, the filter is received in the recess with a radial space gap between a periphery of the filter and a bottom face of the recess to thereby allow the filtered impurities to pass over the filter through the space gap.

14. An injection machine for carrying out plasticizing, metering and injecting steps of injection molding with a plastic material supplied therein, comprising a machine body forming a cylindrical barrel provided with a heating means, an exit passage and a screw plunger therein of a rod form with a helical screw thereabout for rotation and axially reciprocating movements, said screw plunger having a tip head portion and a main screw portion with a check valve therebetween, said check valve comprising a valve body member and a front valve abutment member and a rear valve seat member between which the valve body member is movably disposed and being provided to be opened for allowing a plasticized material to flow forwardly therethrough during the plasticizing and metering step where said screw plunger is allowed to move rearwardly against a back pressure with metered material being accumulated in an axially variable space downstream of said tip head portion, and to be closed for allowing said screw plunger to push the entire amount of the accumulated material forwardly through the exit passage for injection,
characterized in that a filter for effecting melt filtration while the plasticized material is subjected to the metering is provided on said screw plunger so that the filter is carried through the melt by rearward movement of the screw plunger during metering, and said melt filtering means comprises a perforated member having circumferentially arranged perforations for the filtration, and mounted to said screw plunger and slidably fitted to an inner surface of said barrel, and a radially extending purging hole formed in a cylindrical wall of said barrel with a means for opening and closing said purging hole, said purging hole being located in an axial position so that it opens to a local space zone of the interior of said barrel in the vicinity of a rear face of said perforated member, when said screw plunger is in the most forward axial position, in order to have the plasticized material, with non-filtered or residual foreign material or impurities accumulated on said perforated rear face, in said local space, discharged therefrom, intermittently during a long run molding operation, through said purging hole by rotating said screw plunger in the most forward position thereof.

15. An injection machine according to claim 14, wherein said valve body member forms said perforated member.

16. An injection machine according to claim 14, wherein said rear valve seat member forms said perforated member.

17. An injection machine according to claim 14, wherein said front valve seat member forms said perforated member.

18. An injection machine according to claim 14, wherein a member separate from the check valve and located upstream thereof provides said perforated member.

19. An injection machine according to claim 14, wherein said check valve is of a back-flow type with said valve body member forming an annular ring, and said front valve abutment member forming said tip head portion of said screw plunger, and said melt filtering means comprises said rear valve seat member having circumferentially arranged perforations for the filtration and being mounted to said screw plunger between said valve body member and said main screw portion to provide a valve seat for said valve body member, said perforations being positioned to communicate with both an annular valve passage of said check valve defined between a section of said screw plunger and said annular valve body member of solid form and a plasticizing space defined between said main screw plunger portion and said barrel, in which space the plastic material is plasticized by rotating said screw plunger, both said rear valve seat member and valve body member being slidably fitted to an internal surface of said barrel.

20. An injection machine according to claim 19, wherein said main screw portion of said plunger is an axially extending rod having a screw projection extending radially from a periphery thereof and extending helically thereabout, and said rear valve seat member has a peripheral portion extending radially from a level of the rod periphery, said peripheral portion having a conical face, as said rear face, which converges in a rearward direction and is exposed to said plasticizing space with a helical groove formed thereon, said perforations being arranged in said helical groove therealong, said radial purging hole being located in the vicinity of a periphery of said conical face when said screw plunger is in the most forward position.

21. An injection machine according to claim 14, wherein said check valve is of a back-flow type with said valve body member forming an annular ring, and said front valve abutment member forming said tip head portion of said screw plunger, and said melt filtering means comprises: said annular valve body member having circumferentially arranged perforations for the filtration and being axially slidably mounted to said screw plunger; and said circumferential rear valve seat member of a solid form being fixed to said screw plunger and slibably fitted to an internal surface of said barrel, said perforated valve body member being slidably fitted to both the internal barrel surface and a peripheral rod surface of said screw plunger with said preformations allowing the plasticized material to pass therethrough to thereby have the material pass through said check valve at an opened position thereof.

22. An injection machine according to claim 21, wherein said rear solid valve seat member has a circumferential axial projection extending forwardly, said circumferential projection providing said valve seat of a circumferential form and defining an annular recess about said screw plunger, and being radially positioned so that all of said valve body perforations are covered by said annular recess and opened to a local space zone defined thereby when said check valve is in the closed position with said circumferential valve seat abutting against said valve body member.

23. An injection machine according to any one of claims 12 to 22, comprising a second cylindrical barrel inclined to the first-mentioned cylindrical barrel, the two barrels being connected by a passage through which filtered plastic material in the first-mentioned barrel can be transferred by the screw into the second barrel which is provided with a piston or a screw plunger for injection of the transferred plastic material into a mold.

24. An injection machine for carrying out plasticizing, metering and injecting steps of injection molding with a plastic material supplied therein, comprising a machine body forming a cylindrical barrel provided with a heating means, an exit passage and a screw plunger therein of a rod form with a helical screw thereabout for rotation and axially reciprocating movements, said screw plunger having a tip head portion and a main screw portion with a check valve therebetween, said check valve comprising a valve body member and a front valve abutment member and a rear valve seat member between which the valve body member is movably disposed and being provided to be opened for allowing a plasticized material to flow forwardly therethrough during the plasticizing and metering step where said screw plunger is allowed to move rearwardly against a back pressure with metered material being accumulated in an axially variable space downstream of said tip head portion, and to be closed for allowing said screw plunger to push the entire amount of the accumulated material forwardly through the exit passage for injection, characterized in that a filter for effecting melt filtration while the plasticized material is subjected to the metering is provided on said screw plunger so that the filter is carried through the melt by rearward movement of the screw plunger during metering, and said barrel is provided with a nozzle, and said melt filter comprises a perforated member having circumferentially arranged perforations for the filtration, and mounted to said screw plunger and slidably fitted to an inner surface of said barrel, and an annular purging recess formed at the inner barrel surface, said purging recess having an annular bottom face and being located in an axial position so that it provides an annular space gap between a periphery of said filter and said bottom recess face when said screw plunger is in the most forward axial position, said annular space gap allowing the plasticized material, with non-filtered or residual foreign materials or impurities accumulated on a rear face of said filter, to pass over said filter toward said nozzle through said annular space gap when said screw plunger is rotated, to thereby discharge the accumulated impurities from said nozzle.

25. An injection machine, which comprises:
a machine body having an interior for receiving a material to be heated, metered and plastisized;
a metering screw plunger arranged in the interior of the machine body for controlled axial movement within the interior to meter the material and controlled rotational movement to cause conveyance of the material within the interior of the machine body;
a filter mounted on the metering screw plunger to remove impurities from the material as the meter screw plunger meters the material; and
a by-pass passage formed in the machine body for controllably purging the impurities from the interior by controlled rotational movement of the metering screw plunger to convey material with impurities from the interior via the by-pass passage.

26. An injection machine, which comprises:
a machine body having an interior for receiving a material to be heated, metered and plastisized;
a metering screw plunger arranged in the interior of the machine body for metering the material;
a filter mounted on the metering screw plunger to remove impurities from the material as the meter screw plunger meters the material; and
a by-pass passage formed in the machine body for purging the impurities from the interior of the machine body.

* * * * *

UNITED STATES PATENT AND TRADEMARK OFFICE
CERTIFICATE OF CORRECTION

PATENT NO. : 5,246,660

DATED : September 21, 1993

INVENTOR(S) : Shigeru TSUTSUMI

It is certified that error appears in the above-identified patent and that said Letters Patent is hereby corrected as shown below:

Column 3, line 27, change "barred" to --barrel--.

Column 4, line 15, change "barrel" to --barrels--.

Column 5, line 40, change "an" to --a--.

Column 6, line 7, change "a" to --an--.

Column 7, line 8, between "of" and "filter" insert --the--.

Column 8, line 12, change "plasticiging" to --plasticizing--.

Column 12, line 38, delete "as".

Column 16, line 59, change "demoted" to --denoted--.

Column 17, line 2, change "crew" to --screw--.

Column 17, line 3, change "heat" to --head--.

Column 17, line 5, change "gas" to --has--.

Column 17, line 56, change "accumulate" to --accumulated--.

UNITED STATES PATENT AND TRADEMARK OFFICE
CERTIFICATE OF CORRECTION

PATENT NO. : 5,246,660

DATED : September 21, 1993

INVENTOR(S) : Shigeru TSUTSUMI

It is certified that error appears in the above-identified patent and that said Letters Patent is hereby corrected as shown below:

Column 17, line 64, change "plunge" to --plunger--.

Column 17, line 65, change "plunge" to --plunger--.

Column 17, line 66, change "hereby" to --thereby--.

Column 18, line 8, after "shut" insert a comma.

Column 18, line 65, change "take" to --takes--.

Column 19, line 51, change "analogically" to --analogously--.

Column 20, line 10, before "modified" insert --is--.

Column 20, line 48, changed "sandwitched" to --sandwiched--.

Column 25, line 28, change "preformations" to --perforations--.

Column 26, line 29, change "impunities" to --impurities--.

UNITED STATES PATENT AND TRADEMARK OFFICE
CERTIFICATE OF CORRECTION

PATENT NO. : 5,246,660
DATED : September 21, 1993
INVENTOR(S) : Shigeru TSUTSUMI It is certified that error appears in the above-identified patent and that said Letters Patent is hereby corrected as shown below:

Column 26, line 37, change "plastisized" to --plasticized--.

Column 26, line 54, change "plastisized" to --plasticized--.

Signed and Sealed this

Twenty-fourth Day of May, 1994

Attest:

BRUCE LEHMAN

Attesting Officer    Commissioner of Patents and Trademarks